(12) United States Patent
Koike et al.

(10) Patent No.: US 6,742,181 B1
(45) Date of Patent: May 25, 2004

(54) INTER-APPLICATION DATA TRANSMITTING/RECEIVING SYSTEM AND METHOD

(75) Inventors: Kazuhiro Koike, Tokyo (JP); Shigenori Kino, Tokyo (JP); Yasuyuki Mochizuki, Tokyo (JP); Takehisa Mizuguchi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/396,943

(22) Filed: Sep. 15, 1999

(30) Foreign Application Priority Data

Oct. 16, 1998 (JP) .......................... 10-295072
Mar. 15, 1999 (JP) .......................... 11-068100

(51) Int. Cl.<sup>7</sup> ................................ G06F 9/44
(52) U.S. Cl. ................. 719/317; 709/201; 709/202
(58) Field of Search ................. 709/310, 317, 709/200, 201, 202, 203; 715/523

(56) References Cited

U.S. PATENT DOCUMENTS

| | | | | |
|---|---|---|---|---|
| 5,911,776 A | * | 6/1999 | Guck | 709/217 |
| 6,058,120 A | * | 5/2000 | Sabzevari | 370/466 |
| 6,085,203 A | * | 7/2000 | Ahlers et al. | 707/523 |
| 6,195,677 B1 | * | 2/2001 | Utsumi | 709/201 |
| 6,370,590 B1 | * | 4/2002 | Nitz et al. | 709/317 |
| 6,408,350 B1 | * | 6/2002 | Kawamura et al. | 710/62 |

\* cited by examiner

*Primary Examiner*—John Follansbee
*Assistant Examiner*—V. H. Nguyen
(74) *Attorney, Agent, or Firm*—Birch, Stewart, Kolasch & Birch, LLP

(57) ABSTRACT

Data is exchanged among interconnected applications over a network in a mutual use of data and functions without modifying an existing application system. The inter-application data transmission/reception is achieved by a resident agent for controlling an application based upon a flow control rule to obtain data in a format dependent on the application and converting the format of the obtained data into an intermediate format based upon a first data format conversion rule so as to transmit the obtained and converted data in the intermediate format or converting the intermediate format of received data into the format dependent on the application based upon a second data format conversion rule so as to update the obtained data in the format dependent on the application with the received and converted data in the format dependent on the application based upon the flow control rule.

28 Claims, 17 Drawing Sheets

INTER-APPLICATION DATA TRANSMITTING/RECEIVING SYSTEM AND METHOD

BACKGROUND OF THE INVENTION

1. Field of the Invention

The present invention relates to inter-application data transmission/reception, and the embodiments of the present invention relates to a system and method for transmitting/receiving data among interconnected applications over a network, and further to a computer readable storage medium having a computer readable program code stored therein for causing data to be exchanged among various interconnected applications over the network.

2. Description of the Related Art

FIG. 17 of the accompanying drawings shows a block diagram of a conventional integrated architecture of various applications which appears in page 514 of "High-tech Software Dictionary", Ohm Press (May 1991). Referring to FIG. 17, a shared user interface 1, 6 is used by a user for entering data to gain access to a business application 2, 7, respectively, and receiving an output result from the business application 2, 7. A shared communication protocol 3, 8 is used for communication over a network between the business applications 2 and 7 using the shared user interfaces 1 and 6, respectively. A shared API (Application Program Interface) business program 4, 9 is provided with a shared API for a mutual use of data/functions of the business applications 2 and 7. A database 5, 10 stores business data. The business application 2, 7 includes the shared communication protocol 3, 8, the shared API business program 4, 9 and the database 5, 10, respectively. A network 11 links the business applications 2 and 7.

The operation of the conventional art is now described with reference to FIG. 17.

In the case of a single or sole use of the business application 2 involving no data transmission over the network, the user gains access to the shared API business program 4 from the shared user interface 1 via the shared communication protocol 3 to request the use of the function of the shared API business program 4. The shared API business program 4 retrieves data required from the database 5, processes the data and outputs a processed outcome in response to the user's request at the, shared user interface 1 via the shared communication protocol 3.

In the case of the mutual use of data/functions of the business applications 2 and 7 involving data transmission over the network, assuming that the processed result from the business application 2 is transmitted over to the business application 7 to be used, the same process as that of the aforementioned single or sole use of the business application 2 is applied to the use of the function of the business application 2 via the shared user interface 1 by the user. Thereafter, the function of the shared API business program 9 is called from the shared API business program 4 via the shared communication protocols 3 and 8 over the network 11.

Suppose that a company A uses an X made spreadsheet software P implemented in the business application 2, a company B uses a Y made spreadsheet software Q implemented in the business application 7, and Internet is used as the network 11.

In the case of data retrieved from the spreadsheet software P in the system of company A, transmitted over the Internet to the system of company B so as to be written into the spreadsheet software Q, specific programs are required for implementing such series of processing on each of the systems of companies A and B. However, the specific programs are designed only for communication between the systems of companies A and B. In other words, the specific program is not applicable to a communication between the system of company A and the system of a company C, for example, if the system of company C uses the same Y made spreadsheet software Q as that of company B. Data of the spreadsheet software P of company A can be written into the spreadsheet software Q of company B but not the spreadsheet software Q of company C. This is because the spreadsheet software Q of company B is used in a different manner from that of company C in terms of the definition of data and the use of columns. For this reason, a specific program has to be designed exclusively for connecting the systems of company A and company B.

Thus, the conventional business application system is efficient only in the single use of the business application but poses such a problem in the mutual use of data of various business applications. The problem arises when connecting the same made business applications of different types of business or different made business applications of the same type of business. Differences in data formats, communication protocols depending on communication software, functions of business applications and the like make the connection difficult. In order to connect the business applications in such a condition, changes in business programs and communication software may be involved with an increase in development cost.

The integration of the communication protocols and application program interfaces (API) which are application dependent of the conventional art is a solution to the mutual use of data among various business applications.

However, this solution of integration is applicable only to applications newly developed based upon unified standards designed for the mutual use of data. With existing systems, the rebuilding of business programs and communication protocols have to be involved with a large increase in development cost. If there is no information provided on source codes or internal logic, then nothing can be done to solve this problem.

The following examples illustrate the aforementioned problems.

Assuming that integer values stored in the database are represented to be processed in a two-bite data format and in the database 10 in a four-byte data format. In this case, data format conversion is required for a consistent performance of inputting, processing and outputting in the respective business applications.

There is usually a strong relationship between a data format to be used within a business application and control commands/instructions. The communication protocol connecting the user interface and the business application may depend on the implementing method of the user interface.

For example, a communication protocol called Telnet (Telecommunication Network) is usually used with a character-based screen terminal as the user interface for inputting/outputting data, and a communication protocol called HTTP (Hypertext Transfer Protocol) is usually used with a browser as the user interface.

For the mutual use of data of various business applications, there is a need of using the communication protocol to be shared among the various business applications so as to match the data formats and the transmission formats. For this reason, the implementing method of the user interface also has to be shared or specified among the business applications.

Thus, there is a need of matching existing communication protocols, data access APIs, data formats of data to be stored and retrieved, definition of data, user interfaces and the like between different made business applications of the same type of business to be connected for the mutual use of data exchanged. In other words, existing two different business applications in operation may be linked successfully for the mutual use of data exchanged only when some of those changes are involved in either one or both of the business programs.

When the data format of one business application is converted into that of the other, not only the business application program but also the data format of all the stored data is required conversion.

SUMMARY OF THE INVENTION

Embodiments of the present invention are directed to solving the foregoing problems. It is an object of an embodiment of the present invention to achieve the mutual use of data and functions of various business applications over the network without changing business application and communication protocol.

Further, as a transmission format to be used for data transmission a shared data format is employed in the same business, which eliminates the need for converting an application dependent format of each business application.

It is an object of another embodiment of the present invention to add an information processing function dealing with data in the intermediate format so as to implement shared part of the function or a new function of the business application by the same program.

It is an object of another embodiment of the present invention to execute the program obtained through downloading from a remote place via the network so as to achieve an improved performance of the business application in an easy manner.

These and other objects are accomplished by the present invention as hereinafter described in further detail.

According to one aspect of the present invention, an inter-application data transmitting/receiving system includes a data format conversion rule memory for storing a data format conversion rule including a first conversion rule for converting a data format being dependent on an application as an application dependent format into an intermediate format being independent of the application and a second conversion rule for converting the intermediate format into the application dependent format, a flow control rule memory for storing a flow control rule including first and second control commands for executing the application, and a resident agent for executing the application based upon the first control command to obtain data in the application dependent format and converting the data obtained into the data in the intermediate format based upon the first conversion rule, and for receiving and converting the data in the intermediate format into the data in the application dependent format based upon the second conversion rule and executing the application based upon the second control command to update the data in the application dependent format obtained with the data in the application dependent format received and converted.

According to another aspect of the present invention, an inter-application data transmitting/receiving system includes a first application having a first communication protocol, a first system connected with the first application using the first communication protocol, a second application having a second communication protocol, and a second system connected with the second application using the second communication protocol linked to the first system over a network. The first system includes a first data format conversion rule memory for storing a first conversion rule for converting a data format being dependent on the first application as a first application dependent format into an intermediate format being independent of the first application, a first flow control rule memory for storing a first control command for executing the first application, and a first resident agent for executing the first application based upon the first control command stored in the first flow control rule memory to obtain data in the first application dependent format and converting the first application dependent format of the data into the intermediate format based upon the first conversion rule. The second system includes a second data format conversion rule memory for storing a second conversion rule for converting the intermediate format of the data into a data format being dependent on the second application as a second application dependent format, a second flow control rule memory for storing a second control command for executing the second application, and a second resident agent for receiving the data in the intermediate format over the network, converting the intermediate format of the data received into the second application dependent format based upon the second conversion rule, executing the second application to update the data in the second application dependent format with the data received in the second application dependent format based upon the second control command stored in the second flow control rule memory.

According to a further aspect of the present invention, an inter-application data transmitting/receiving system for exchanging data among interconnected applications over a network, the inter-application data transmitting/receiving system includes a business dependent processing unit for gaining access to an application through a procedure defined for the application, executing the application based upon a control command predetermined for executing the application, receiving data in a format being dependent on the application as an application dependent format, converting the application dependent format of the data into an intermediate format to be shared by the interconnected applications for transmitting the data, and exchanging the data in the intermediate format among the interconnected applications over the network.

According to a still further aspect of the present invention, a method for transmitting/receiving data among a plurality of interconnected applications over a network, the method includes the steps of interfacing an application through a procedure designed for the application to be processed, storing a flow control rule for executing the application in a flow control rule memory for executing the application, storing a data format dependent on the application as an application dependent format, a data format shared for exchanging data among the plurality of applications as an intermediate format and a data format conversion rule including a first conversion rule and a second conversion rule in a data format conversion rule memory, executing the application based upon the flow control rule to obtain the data, converting the application dependent format of the data into the intermediate format to be transmitted over the network based upon the first conversion rule, receiving the data over the network; converting the intermediate format of the data received into the application dependent format based upon the second conversion rule, and executing the application based upon the flow control rule to update the data obtained in the application dependent format with the data received in the application dependent format.

According to a still further aspect of the present invention, a computer readable storage medium includes a computer readable program code stored therein for causing data to be exchanged among a plurality of interconnected applications over a network. The computer readable program code includes an interface code segment for causing a computer to interface and application through a procedure designed for the application to be processed, a first storing code segment for causing the computer to store a flow control rule in a flow control rule memory, a second storing code segment for causing the computer to store a data format dependent on the application as an application dependent format, a data format to be shared among the plurality of Interconnected applications for exchanging the data as an intermediate format and a data format conversion rule including a first conversion rule and a second conversion rule in a data format conversion rule memory, a first execution code segment for causing the computer to execute the application based upon the flow control rule to obtain the data in the application dependent format, a first conversion code segment for causing the computer to convert the application dependent format of the data obtained into the intermediate format to be transmitted over the network based upon the first conversion rule, a receive code segment for causing the computer to receive the data over the network, a second conversion code segment for causing the computer to convert the intermediate format of the data received over the network into the application dependent format based upon the second conversion rule, and a second execution code segment for causing the computer to execute the application based upon the flow control rule to update the data obtained in the application dependent format with the data received in the application dependent format.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
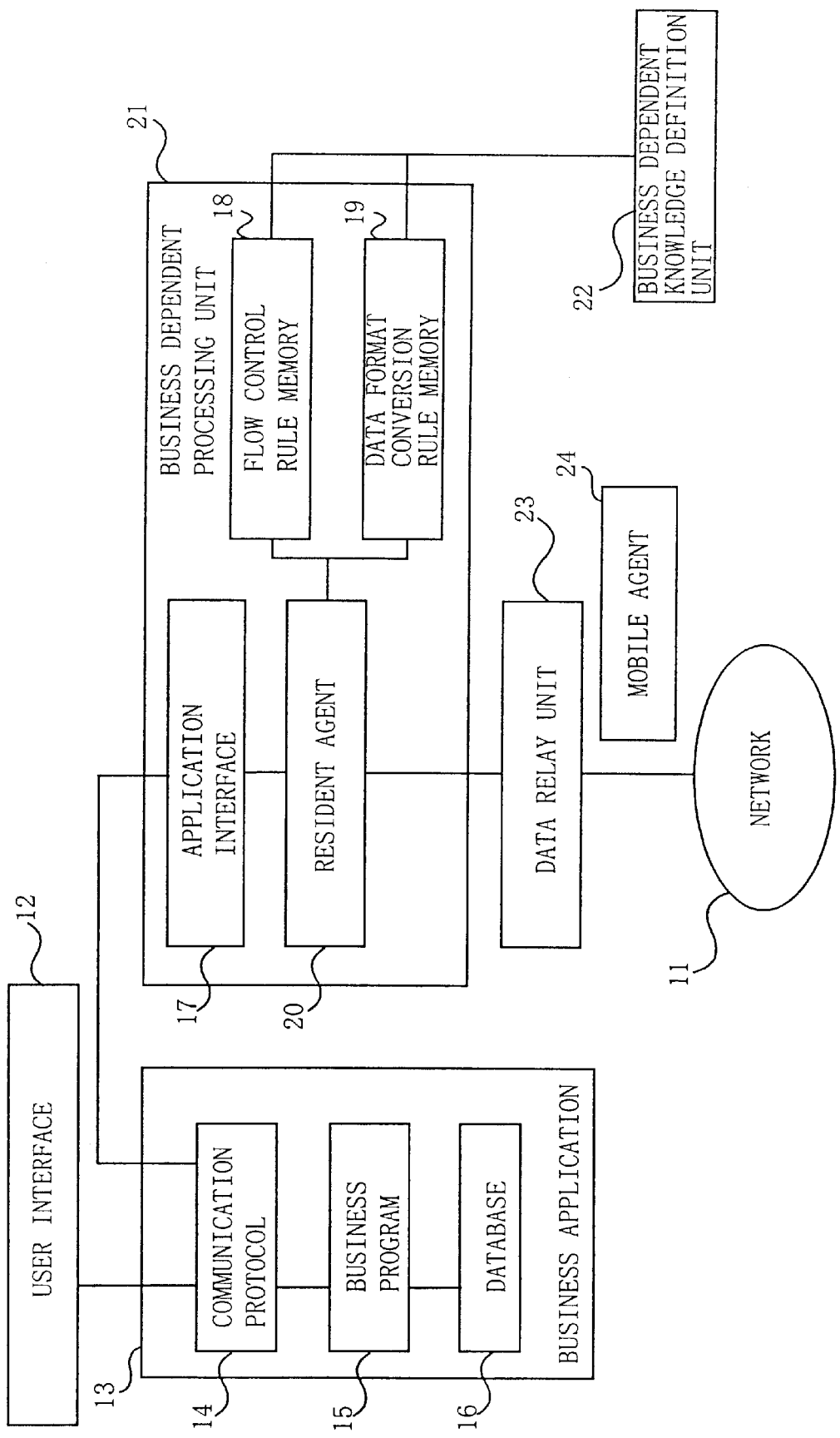
FIG. 1 shows a block diagram of an inter-application data transmitting/receiving system according to a first embodiment of the present invention.

Reference will now be made in detail to the present preferred embodiments of the invention, examples of which are illustrated in the accompanying drawings, wherein like reference numerals indicate like elements through out the several views.

Embodiment 1

FIG. 1 shows a block diagram of an inter-application data transmitting/receiving system for transmitting/receiving data among interconnected applications over a network according to a first embodiment of the present invention.

Referring to FIG. 1, the user enters data to use the function of a business application 13 at a user interface 12 where the user receives an outputted result. The business application 13 includes a communication protocol 14 for the business application 13 or the user interface 12 to communicate with the other side over a network, a business program 15, and a database 16 for storing business data. The business application here refers to an application designed for a non-personal use and not always for business purposes.

In the embodiments of the present invention, the application may be interpreted as an application system, an application program, an application software, a software or the like.

A business dependent processing unit 21 including an application interface 17, a flow control rule memory 18, a data format conversion rule memory 19 and a resident agent 20 provides an execution environment for business dependent portions.

The application interface 17 obtains access to an application through predetermined procedures by the application to be processed by the business dependent processor 21.

The application interface 17 of this embodiment designed for communicating with the business application 13 emulates the communication protocol 14 so as to interface with the business program 15.

The flow control rule memory 18 stores flow control rules defining processing rules for transmitting/receiving data to/from the application interface 17. Specifically, the flow control rules call menus of the business application 13 in order and input values in a data field so as to display data desired on a screen. Further, the flow control rules represent procedures ruled for the user to call the menus through a keyboard or mouse operation or input data through a keyboard operation.

The data format conversion rule memory 19 stores the data formats of various interconnected applications as application dependent formats, an intermediate format which is a data format independent of the respective interconnected applications shared to be used for exchanging data among the various interconnected applications over the network, and data format conversion rules including a first conversion rule for converting one of the application dependent formats into the intermediate format and a second conversion rule for converting the intermediate format into one of the application dependent formats.

The resident agent 20 monitors data in the database 16 to detect a change in the data, and also interprets the flow control rules and the data format conversion rules into execution.

A business dependent knowledge definition unit 22 defines the flow control rules and the data format conversion rules of the flow control rule memory 18 and the data format conversion rule memory 19, respectively, before data transmission/reception among interconnected applications. In other words, the business dependent knowledge definition unit 22 uses a program to set rules to be stored in the flow control rule memory 18 and the data format conversion rule memory 19.

A data relay unit 23 relays data outputted from/to the business application 13 to/from a counterpart business application. A mobile agent 24 conveys relayed data by the data relay unit 23 to/from interconnected business applications over a network 11 linking the interconnected business applications.

The same functions as the individual elements of the inter-application data transmitting/receiving system of this invention may alternatively be implemented through a program. This applies to the respective elements of the other embodiments of the present invention.

The program may be stored in a computer-readable storage medium in the form of a computer readable program code. The computer readable program code includes code segments identifying the separate program functions.

Figure 2:
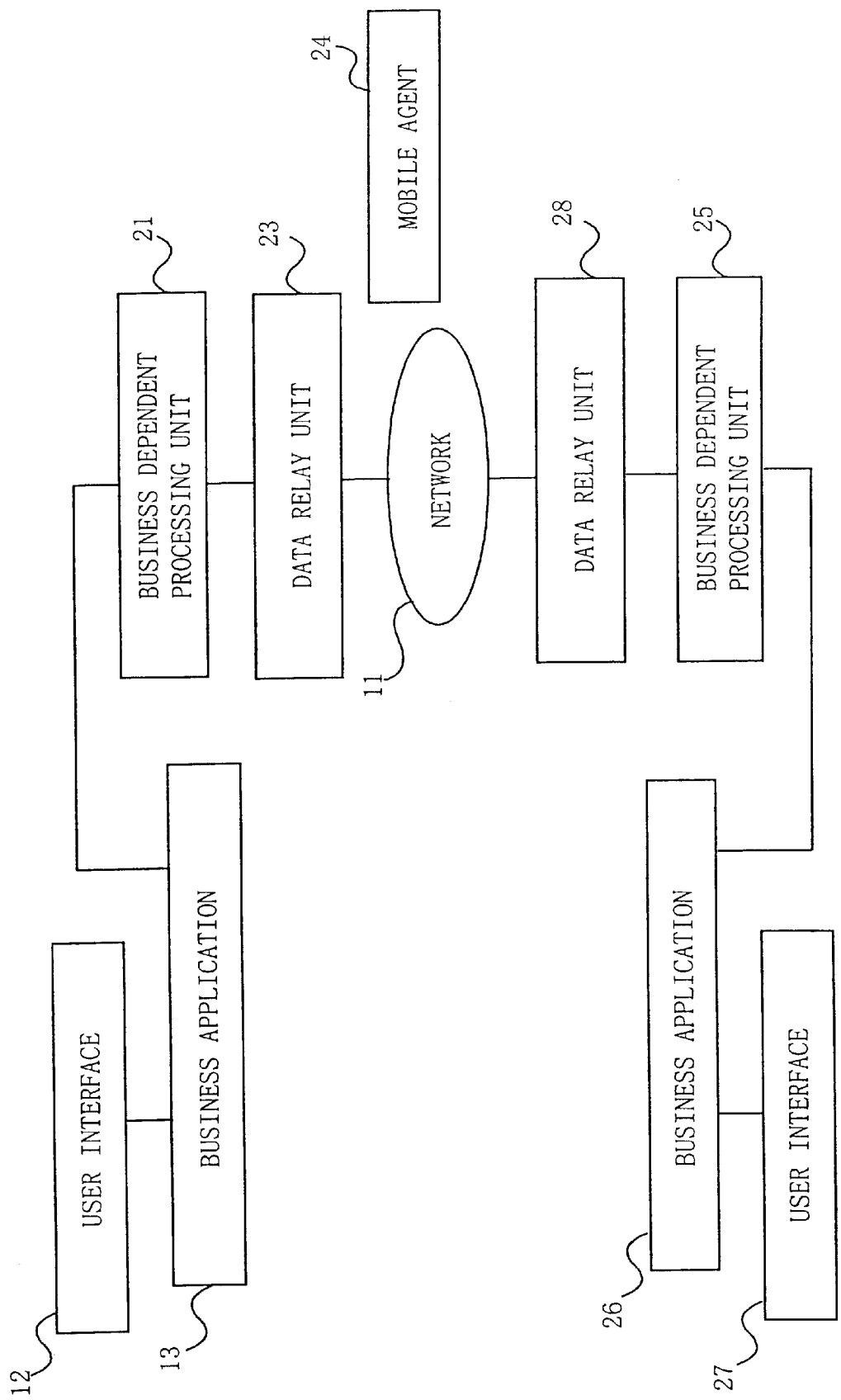
FIG. 2 shows a block diagram illustrating an overall network connection view with the inter-application data transmitting/receiving system of FIG. 1 applied.

FIG. 2 shows an overall network connection view with the inter-application data transmitting/receiving system of FIG. 1 with the business application 13 being linked to a counterpart business application over the network.

Referring to FIG. 2, the inter-application data transmitting/receiving system of FIG. 1, which is assumed to be the system of a company A, is linked over the network 11 to a counterpart system, which is assumed of a company B, including a user interface 27, a business application 26, a business dependent processing unit 25 and a data relay unit 28. The mobile agent 24 moves within the network 11 to convey data to be transmitted.

The configuration of the business application 26 and that of the business dependent processing unit 25 are the same as those of the business application 13 and the business dependent processing unit 21, respectively, of FIG. 1, which are not shown in the simplified block diagram of FIG. 2.

It is assumed here that the system of company A implements an X made spreadsheet software P as the business application 13 and the system of company B implements a Y made spreadsheet software Q as the business application 26.

In this situation, data is retrieved from the spreadsheet software P of company A to be written into the spreadsheet software Q of company B.

Figure 3:
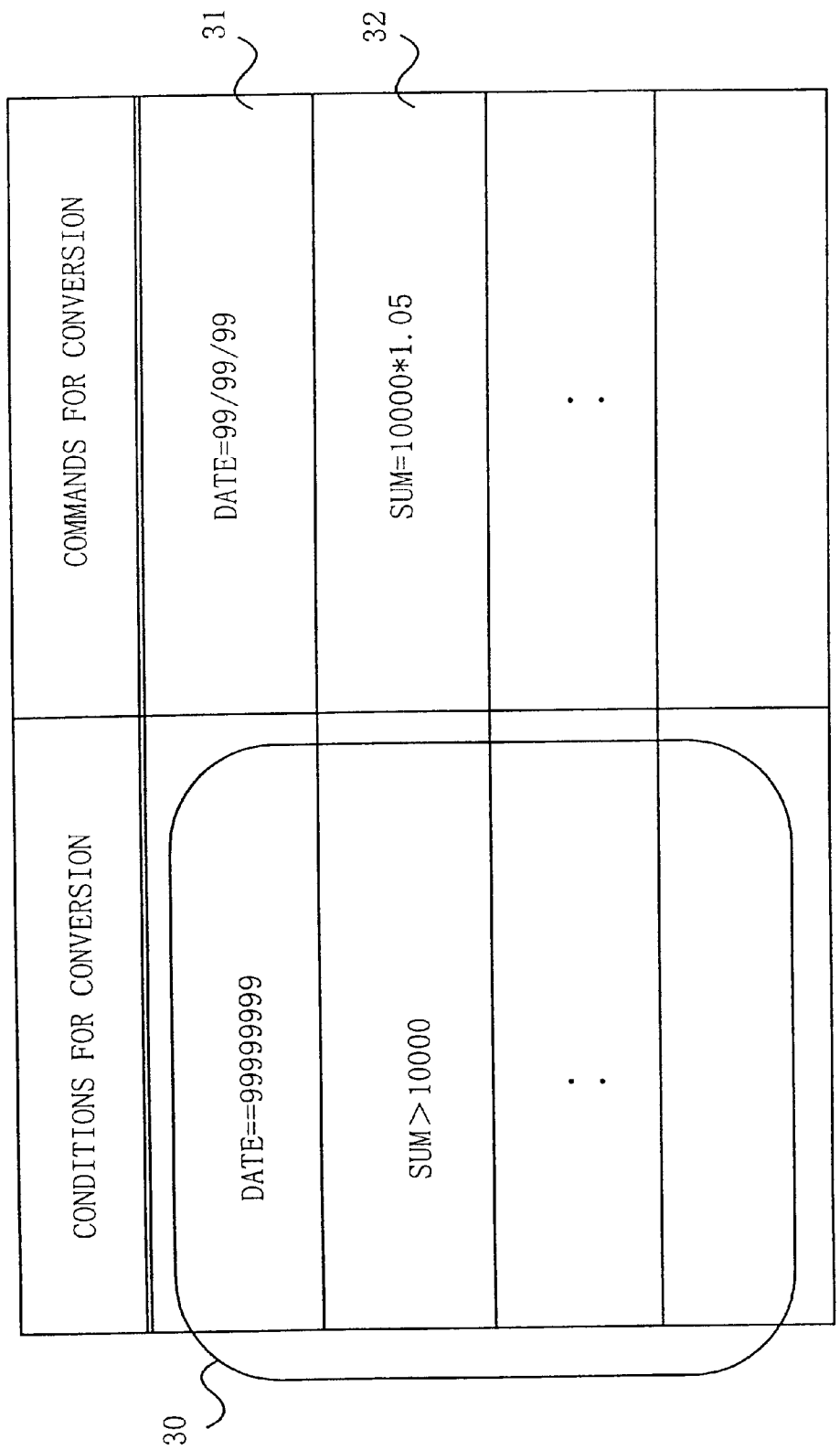
FIG. 3 is a table of data format conversion rules of the first embodiment.

FIG. 3 shows a table of data format conversion rules stored in the data format conversion rule memory 19 including a list of conditions for conversion 30 and a corresponding list of commands for conversion 31 and 32, each representing a specific processing of conversion. The table of FIG. 3 stored in the data format conversion rule memory 19 collects conditions for conversion and corresponding commands for conversion in sets as the data format conversion rules. When specific conditions are satisfied for conversion, the data format conversion rules are used for assigning corresponding commands for conversion.

Figure 4:
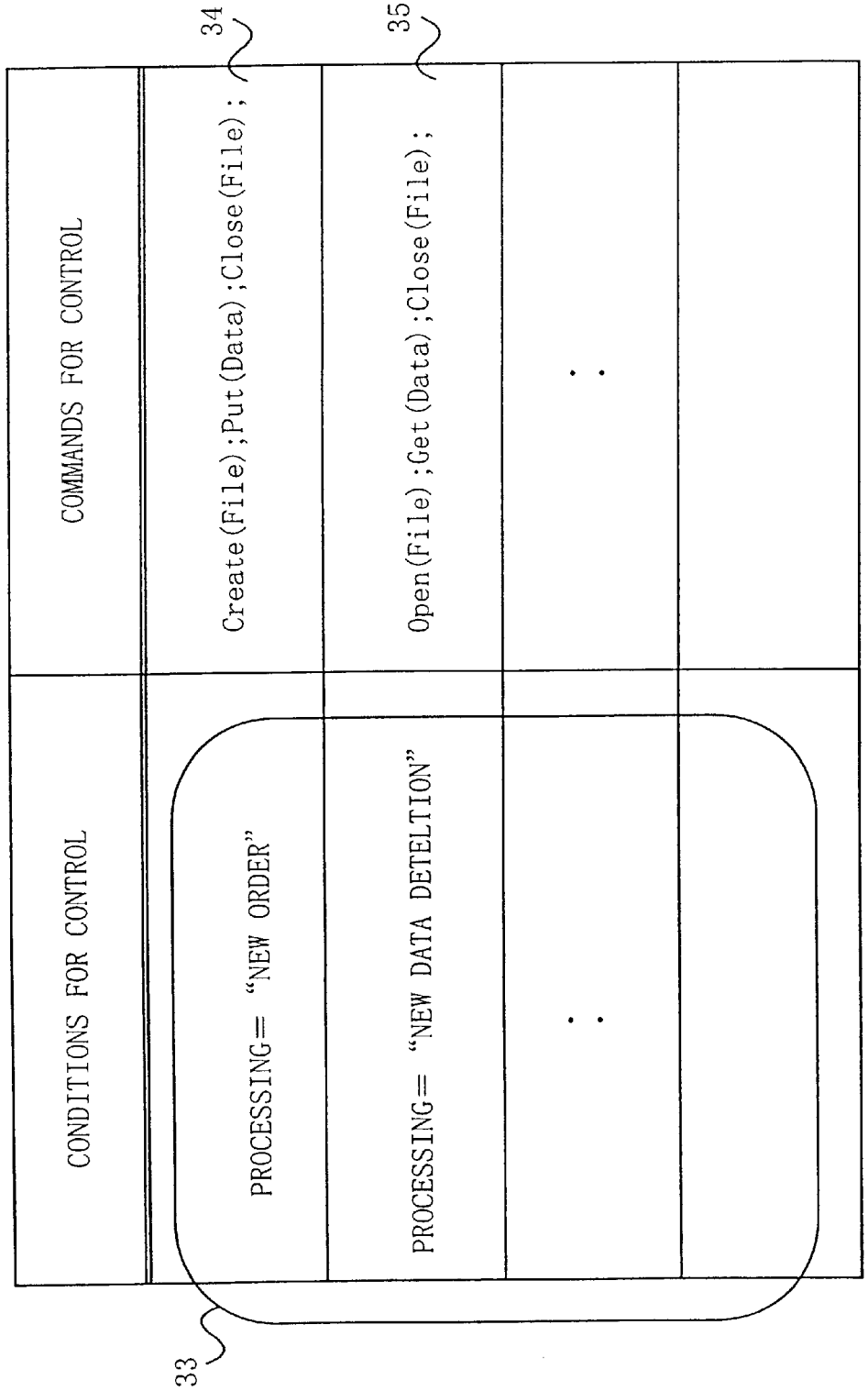
FIG. 4 is a table of flow control rules of the first embodiment.

FIG. 4 shows a table of flow control rules stored in the flow control rule memory 18 including a list of conditions for control 33 and a corresponding list of command sequences for control 34 and 35, each representing a specific command sequence of control. The table of FIG. 4 stored in the flow control rule memory 18 collect conditions for control and corresponding command sequences for control in sets as the flow control rules. When specific conditions are satisfied for control, the flow control rules are used for assigning corresponding commands for control. For example, the flow control rules include rules for reading a value of data to be transmitted to an application B from an application A with the existing data of application A displayed on the screen in the event of the data transmitted from application A to application B, and rules for writing the value of the transmitted data in a data field of application B with a new data creation screen displayed on the screen in the event of creating new data based upon the data transmitted from application A in application B.

Figure 5:
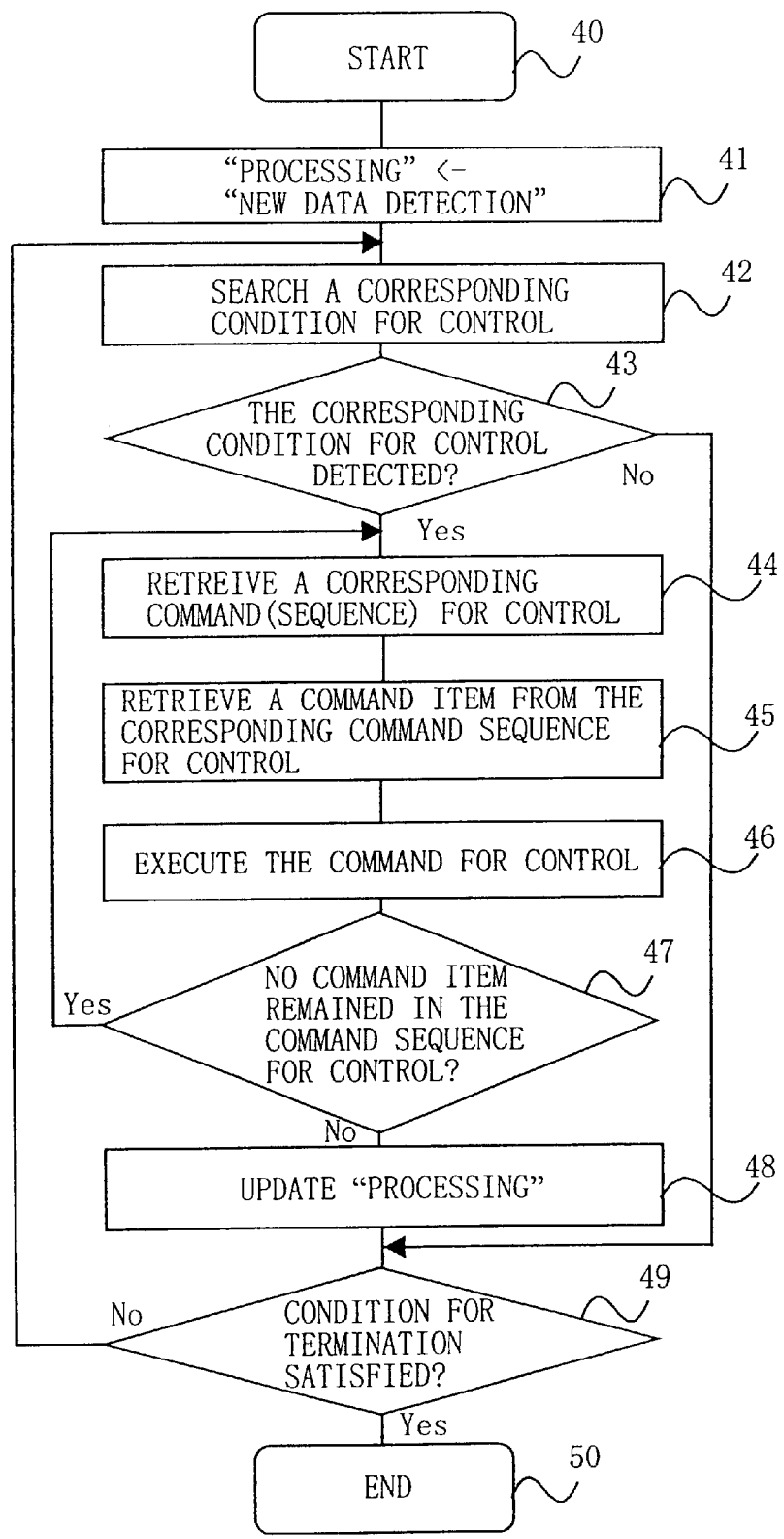
FIG. 5 shows a flowchart illustrating a flow control operation executed by a resident agent of the first embodiment.

FIG. 5 is a flowchart illustrating a series of flow control operations performed by the resident agent 20 based upon the flow control rules.

Figure 6:
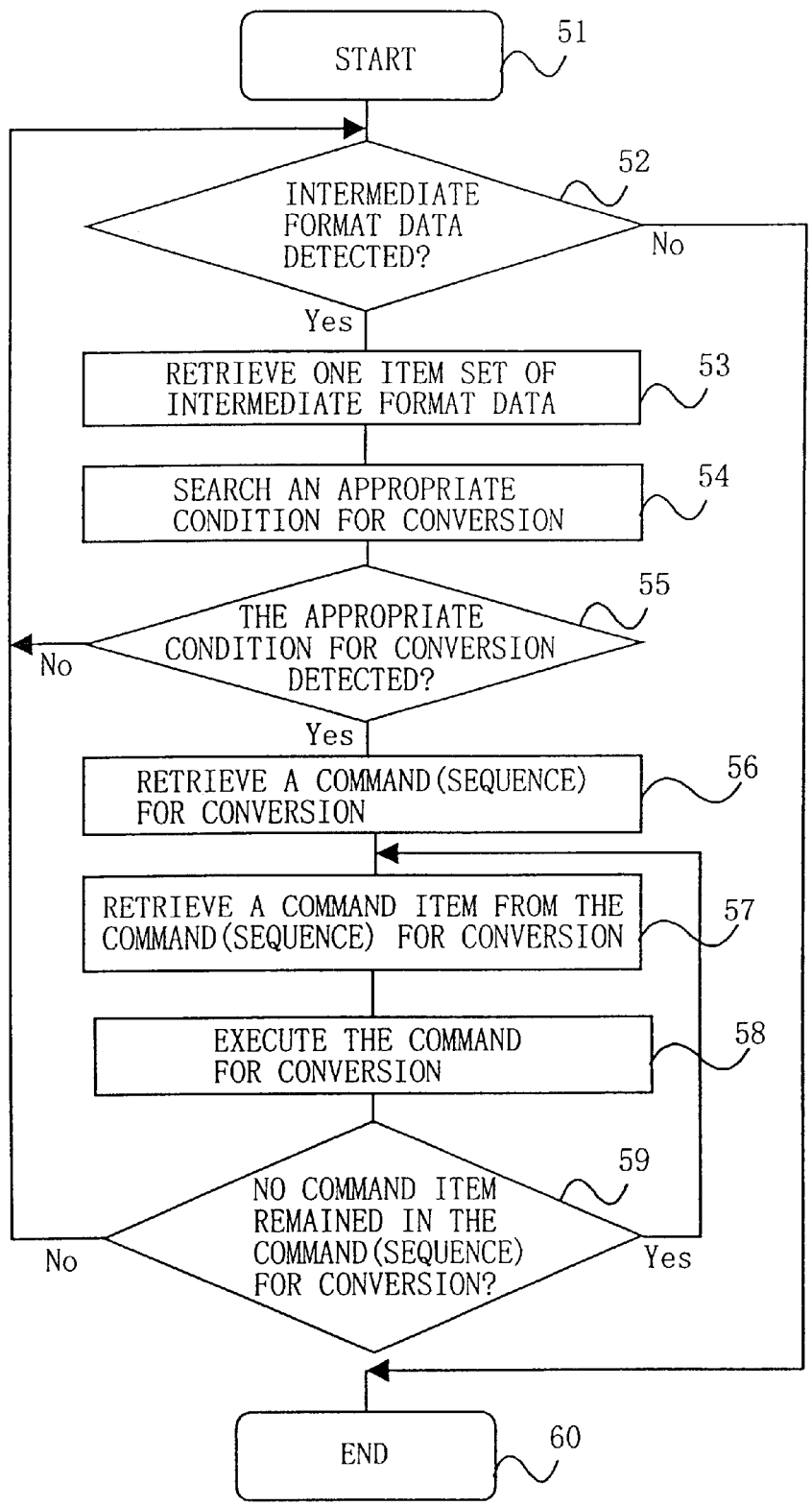
FIG. 6 shows a flowchart illustrating a data format conversion operation executed by the resident agent of the first embodiment.

FIG. 6 is a flowchart illustrating a series of data format conversion operations performed by the resident agent 20 based upon the data format conversion rules.

An operation of the inter-application data transmitting/receiving system of this embodiment is now discussed with reference to FIGS. 1 through 6.

Initially, a system operation of company A of FIG. 2 is discussed assuming that the flow control rules stored in the flow control rule memory 18 and the data format conversion rules stored in the data format conversion rule memory 19 are predetermined through the business dependent knowledge definition unit 22.

Figure 17:
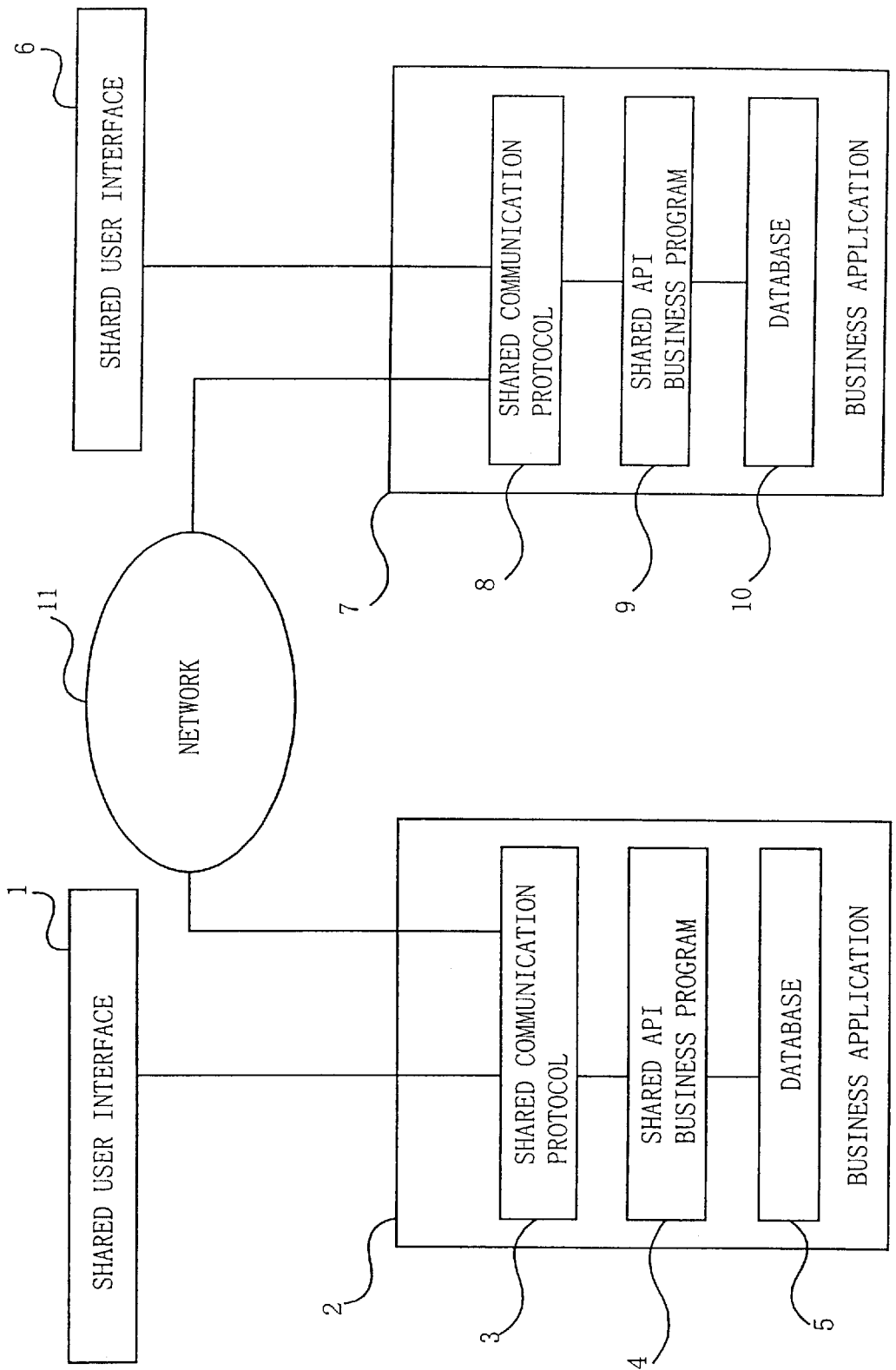
FIG. 17 shows a block diagram illustrating an overall network connection of an inter-application data transmitting/receiving system with conventional business application systems.

Referring to FIG. 1, in the same manner as that of the conventional art with reference to FIG. 17, the user operates the user interface 12 to gain access to the business program 15 via the communication protocol 14 for requesting the use of the function of the business program 15. The business program 15 then reads out data required from the database 16 to be processed and outputs a processed result in response to the user's request at the user interface 12 via the communication protocol 14.

The resident agent 20 is connected always or at stated periods to the business program 15 using the communication protocol 14 via the application interface 17. The resident agent 20 reads out data stored in the database 16 using the data readout function of the business program 15, stores a current status of the data, and compares the current status with the previous status of the data. When detecting a change in the status of data, the resident agent 20 calls the flow control rules predetermined by the business dependent knowledge definition unit 22 from the flow control rule memory 18 to provide a corresponding processing command to the change. With no change detected in the status of data, then no action is taken.

Such a change in the status of data may be detected when data is newly created, updated, or deleted, or when a data value becomes a specific value or the like.

The series of flow control operations calling the flow control rules stored in the flow control rule memory 18 for control by the resident agent 20 are now described with reference to the table of flow control rules of FIG. 4 together with the flowchart of FIG. 5.

The resident agent 20, when activated, sets a value representing a "new data detection" in a field of "processing" for having the resident agent 20 "detect a new data" in step 41. In step 42, the specific condition for control that the "processing" indicates the "new data detection" is searched in the list of conditions for control 33 in the table of FIG. 4. In step 43, it is determined whether the specific condition exists. With no detection of the specific condition, the operation terminates in step 50. According to the table of FIG. 4, the specific condition for control, i.e. "processing= new data detection", is detected, and therefore, the operation proceeds to step 44 to retrieve "Open (File); Get (Data); Close (File);" of the command sequence for control 35 corresponding to the detected condition for control. In step 45, one of the commands in the command sequence 35 is retrieved. Here, as an example, "Open (File)" is retrieved.

In step 46, the retrieved command is executed for control. With this example, the resident agent 20 transfers "Open (File)" as a request to the application interface 17 through a request call operation. The application interface 17 transfers the request of "Open (File)" to the business program 15 via the communication protocol 14. The business program 15 executes the command of "Open (File)" and then transfers a processed result through the same path back to the resident agent 20 as that of the request call operation.

In step 47, the resident agent 20 determines whether a command remained unexecuted in the command sequence for control 35. With a unexecuted command detected, then the operation returns to step 44 to repeat the aforementioned series of operations of steps 44 through 46 in the same manner as that discussed with "Open (File)" until all the commands of the command sequence for control 35 have been executed. With this example, there are two commands of "Get (Data)" and "Close (File)" remained unexecuted in the command sequence for control 35, then the two commands have to be executed.

With no command unexecuted detected of the command sequence for control 35, then the "processing" field is updated in step 48. Specifically, the "processing" field may be updated based upon an executed result of control performed in step 46, based upon data in the intermediate format indicating "processing=XXXX" for updating transferred from the data relay unit 23, or based upon a user's indication of updating via the resident agent 20. For example, with the indication of "processing =termination", the operation terminates in step 50 as determination result of termination in step 49. With no condition for termination being satisfied, the operation returns to step 42 for repeating the performance of the series of flow control operations.

The flow control rules may be represented with a function call based processing approach with "Create (File)", "Put (Data)", "Close (File)" and "Open (File)", "Get (Data)", "Close (File)" in the table of FIG. 4. The type of processing approach is determined by the way how the application interface 17 transfers a request to the business program 15. The application interface may be of a primitive type corresponding to a keyboard based entry type transferring, for example, hexadecimal codes such as "0×0A", "0×20" and "0×3A". The application interface may be of another type calling macro such as "Read-in File". In both cases, being independent itself of the contents of the request, the resident agent 20 is allowed to stay unchanged or unmodified when the application interface 17, the flow control rules and the data format conversion rules are modified or change.

The resident agent 20, upon reception of data resulted from the operation of the business program 15, converts the application dependent format of the data of the business program 15 into the intermediate format as the data format shared for exchanging data among various applications, and then converts the data converted into the intermediate format based upon the data format conversion rules.

A conversion operation is now discussed with reference to the table of data format conversion rules of FIG. 3 and the flowchart of FIG. 6.

The resident agent 20 converts data received from the business program 15 into data in the intermediate format. The intermediate format may be a combined series of the sets of the names and values of items, each set being separated by a separation symbol "&" from others like "item 1=value 1 & item 2=value 2 & item 3=value 3 & . . . ."

Referring to the flowchart of FIG. 6, the resident agent 20 determines whether there exists data in the intermediate format in step 52. With no data in the intermediate format detected, then the operation terminates in step 60. When detecting data in the intermediate format, the resident agent 20 retrieves one set of the data from the intermediate format in step 53, searches an applicable and appropriate condition for conversion in the list of conditions for conversion 30 in step 54, and determines whether an appropriate condition for conversion with the same item is detected in step 55.

With no appropriate condition for conversion detected, the operation returns to step 52. With the appropriate condition for conversion detected, then the corresponding command for conversion is retrieved from the list of commands for conversion in step 56. With a detected condition for conversion, "date==99999999", for example, the corresponding command for conversion 31, "date=99/99/99", is retrieved.

With the table of FIG. 3, only a single command for conversion is provided for each corresponding condition for conversion. Alternatively, however, a command sequence including a plural number of commands for conversion may replace the single command. In this situation, one command in the command sequence for conversion is selected to be retrieved in step 57.

In step 58, the resident agent 20 executes the command for conversion replacing "99999999" of the "date" of the data in the intermediate format with "99/99/99". In step 59, the resident agent 20 determines whether the command for conversion 31 has been executed with no detection of command, or alternatively, all items in the command sequence for conversion have been executed. With no command item detected, then the operation returns to step 52 to deal with a next item set for conversion of the data in the intermediate format. With a command detected, then the operation returns to step 57 to repeat the same operations of steps 57 through 59 until no command item is detected in the command sequence for conversion. When all the item sets of the data in the intermediate format data have been processed through conversion or replacement in the same manner as that aforementioned, the resident agent 20 transfers the data in the intermediate format to the data relay unit 23. With no detection of an appropriate condition for conversion, then no such action is taken.

The data relay unit 23 transfers the data in the intermediate format or intermediate format data directly to the mobile agent 24. The mobile agent 24 moves within the network 11 to convey the intermediate format data to the data relay unit 28 of the counterpart application system of FIG. 2.

This brings the explanation of the system operation of company A of FIG. 2 to an end. An operation of the system of company B of FIG. 2 is now discussed.

The data relay unit 28 transfers the data to the business dependent processing unit 25 or actually to a resident agent 20a in the business dependent processing unit 25 whose internal configuration, which is the same as that of the business dependent processing unit 25 of FIG. 1, is not illustrated in the block diagram of FIG. 2.

The resident agent 20a converts the intermediate format data into the data in a data format dependent on the business application 26 based upon the data format conversion rules of FIG. 3 in accordance with the flowchart of FIG. 6.

Referring to the flowchart of FIG. 6, the resident agent 20a retrieves one item set of name and value of the data in the intermediate format in step 53, searches a corresponding and appropriate condition for conversion in the list of conditions for conversion 30 in step 54, and retrieves the corresponding and appropriate condition for conversion. With a condition for conversion, "sum>10000", detected in step 55, for example, then the command for conversion 32 is retrieved in step 56. In step 57, a corresponding command for conversion, "sum=10000*1.05", of a conditional expression is retrieved. In step 58, the resident agent 20a evaluates the conditional expression. If the "sum" of the intermediate format data satisfies this condition, the resident agent 20a replaces the value of the "sum" of the intermediate format data with "10000*1.05" based upon the corresponding command for conversion, "sum=10000*1.05".

With no condition for conversion being detected in step 55, then no action is taken and the operation returns to step 52. After converting the data in step 58, it is determined whether no command item remains for conversion in the command for conversion 32 in step 59. With no command being detected, then the operation returns to step 52 and with a command being detected, then the operation returns to step 57. When all the items in the intermediate format data have been replaced or converted in the same manner as that aforementioned, the operation of data format conversion is terminated.

Then, the resident agent 20a writes the data into the business application 26 based upon the flow control rules of FIG. 4 The resident agent 20a performs a data write control operation through a series of operational steps of the flowchart of FIG. 5. Initially, in step 41, a "new order" is set in the "processing" field so as to have the resident agent 20a perform processing in response to a new order came from a counterpart application. In step 42, a corresponding condition for control, "processing=new order", is searched in the list of conditions for control 33. With the corresponding condition for control being detected in step 43, then the corresponding command sequence for control 34, "Create (File); Put (Data); Close (File);", is obtained in step 44. One command item, "Create (File)", in the corresponding command sequence for control 34 is retrieved in step 45. The retrieved command is executed for control in step 46. According to this example, the resident agent 20a transfers "Create (File)" to the application interface 17 as a request.

The application interface 17 transfers the request, "Create (File)", to the business program 15 via the communication protocol 14. The business program 15 executes the command for control, "Create (File)", and transfers a processed result of control through the same path back to the resident agent 20a as that of the request call operation. In step 47, it is determined whether no command item remains in the command (sequence) for control 34. With a command item being detected, then the operation returns to step 44. With no command being detected, then the "processing" field is updated in step 48.

As aforementioned, the processing field is updated based upon an executed result of control performed in step 46, based upon an indication of updating such as "processing= XXXX" in the intermediate format data transferred from the data relay unit 23, or based upon an indication of updating by the user via the resident agent 20. With "processing= termination", for example, termination is determined in step 49, when the operation terminates in step 50. With no condition being satisfied for termination, the operation returns to step 42 to deal with another item for control.

Thus, according to the first embodiment, data retrieved from the business application within the system of company A is allowed to be written into the business application within the system of company B.

As aforementioned, it is the mobile agent which conveys the data retrieved from the business application within the system of company A or B and the resident agent which processes the data retrieved to be written into the business application within the system of company B or A, respectively, according to this embodiment. In addition, when the mobile agent arrives at the system, the mobile agent may become the resident agent. In other words, the mobile agent may stays or resides in the system and acts as the resident agent to process the data retrieved to be written into the business application within the system of company B or A. Further, the mobile agent may act as the resident agent in the system to retrieve data from the business application in the system of company A or B and process the data retrieved and convey the data to the system of company B or A, respectively, over the network.

The inter-application data transmitting/receiving system of this embodiment may also be applied to two or more systems provided within a company, other than The inter-application data transmitting/receiving system of this embodiment may also be applied to two or more systems provided within a company, other than companies A and B of this specific embodiment, as long as the systems are connected via a network.

With reference to FIG. 2, the business applications 13 and 26 are symmetrically linked over the network via the data relay units 23 and 28, respectively. The aforementioned approach of transmitting data from the business application 13 to the business application 26 is also fully applicable to transmission of data inversely from the business application 26 to the business application 13.

As aforementioned, the inter-application data transmitting/receiving system of this embodiment employs the communication protocol unchanged for communication by the user interface and the application. This requires no addition nor change in the user interface, the application itself and the database.

Further, according to this embodiment, the resident agent monitors the database to detect the change in the status of the data automatically and initiates an processing operation automatically in response to the change, which allows the user of the application to operate normal procedures requiring no special and extra procedures to deal with the change.

Still further, according to this embodiment, portions dependent on the business application such as the flow control rules and the data format conversion rules, being separated from other portions independent of the business application, are designed for ease of modification or change by the business dependent knowledge definition unit. This allows a network system linking the business application system to other various business application systems over the network to be implemented in an easy manner.

Embodiment 2

In contract with the inter-application data transmitting/receiving system of the first embodiment, provided with the data relay units 23 and 28 in both sides of the two business application systems over the network of FIG. 2, a second embodiment of the present invention introduces an inter-application data transmitting/receiving system provided with a single data relay unit which links both of the business dependent processing units 21 and 25 together of FIG. 2 over the network 11.

Figure 7:
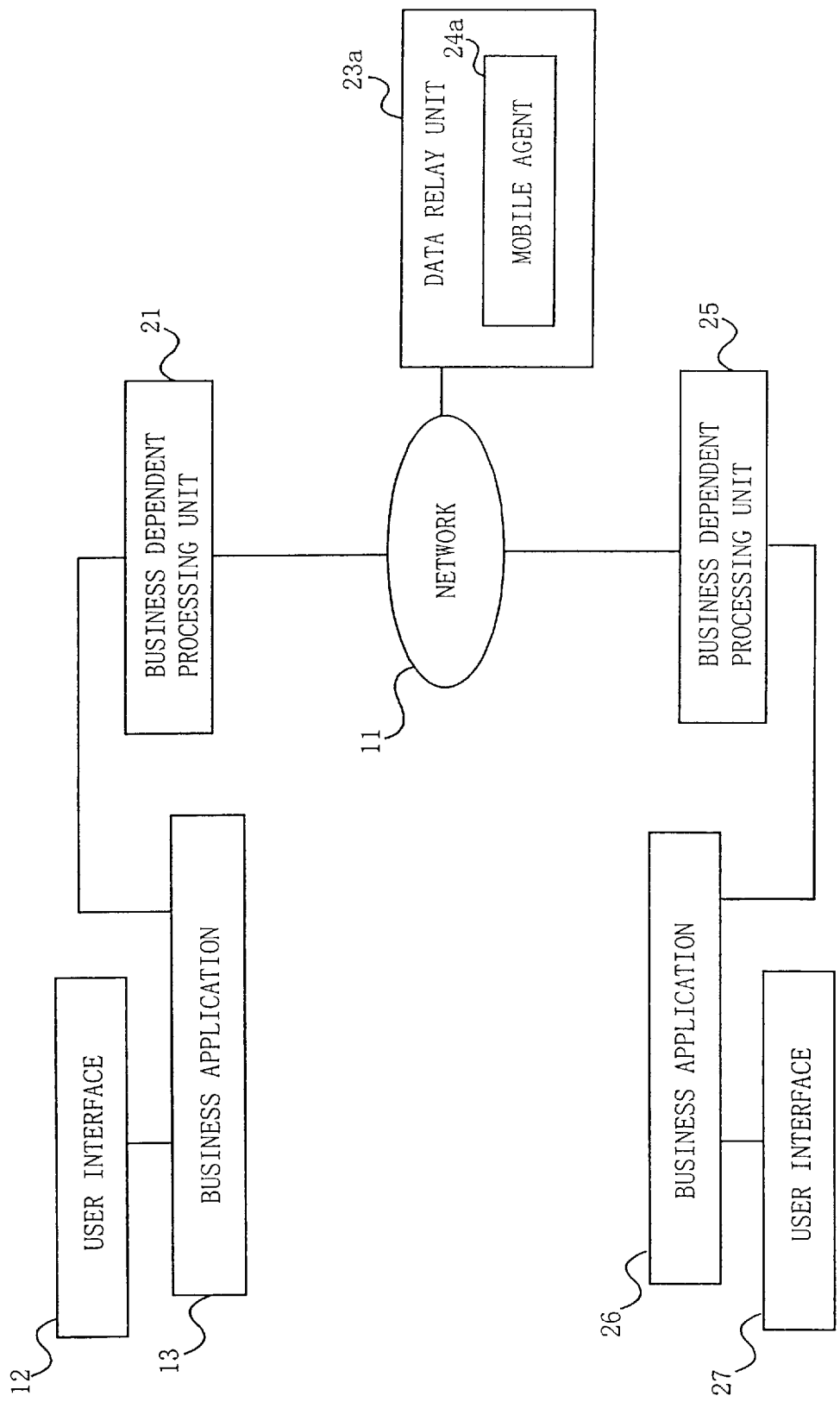
FIG. 7 shows a block diagram illustrating an overall network connection view with an inter-application data transmitting/receiving system according to a second embodiment of the present invention.

FIG. 7 shows an overall network connection view of the inter-application data transmitting/receiving system according to the second embodiment. Some elements of FIG. 7 are similar to those of FIG. 2 with the same reference numerals and will not be elaborated here for avoiding the repetition of the same explanation as that aforementioned. Referring to FIG. 7, a data relay unit 23a is linked to the network 11, a local mobile agent 24a performs locally within the data relay unit 23a. The business application 26 has the same configuration as that of the business application 13 of FIG. 1 discussed in the first embodiment. The business dependent processing unit 25 has the same configuration as that of the business dependent processing unit 21 of FIG. 1.

An operation of the inter-application data transmitting/receiving system of the second embodiment is now discussed with reference to FIG. 7.

Referring to FIG. 7, the user calls the function of the business application 13 from the user interface 12. The business dependent processing unit 21 connected always or at stated periods with the business application 13 stores the current status of the business application 13 and compares the current status with the previous status at retrieval to detect a change in the status. When detecting the change, the business dependent processing unit 21 performs an appropriate operation to deal with the change. The business applications 13 and 26 operate in the same manner as that elaborated in the first embodiment. The business dependent processing units 21 and 25 operate in the same manner as that elaborated in the first embodiment.

As shown in the drawing of FIG. 7, the mobile agent 24a, being linked to the two business applications 13 and 26 over the network, does not move in the network but moves locally within the data relay unit 23a to perform an operation having the same effect as that of the data relay unit 23, 28 of the first embodiment conveying and transferring the data from the business dependent processing unit 21 to the business dependent processing unit 25, and vice versa.

The data is transferred from the business application 13 over the network 11 to the data relay unit 23a where the mobile agent 24a is generated. The mobile agent 24a moves locally in the data relay unit 23a to transfer the data to the business dependent processing unit 25 via a storage unit. The business dependent processing unit 25 converts the intermediate format of the data into a data format dependent on the business application 26 and transfers the converted data to the business application 26 over the network 11.

Thus, the data relay unit provided in the network can be separated from the application system, thereby reducing some elements of the application system.

Embodiment 3

In contrast with the inter-application data transmitting/receiving system of the first embodiment provided with a single business dependent processing unit in each application system in the network, a third embodiment of the present invention introduces an inter-application data transmitting/receiving system provided with a plural number of business dependent processing units in each application system for distributed processing in order to improve the capability of processing and throughput.

Figure 8:
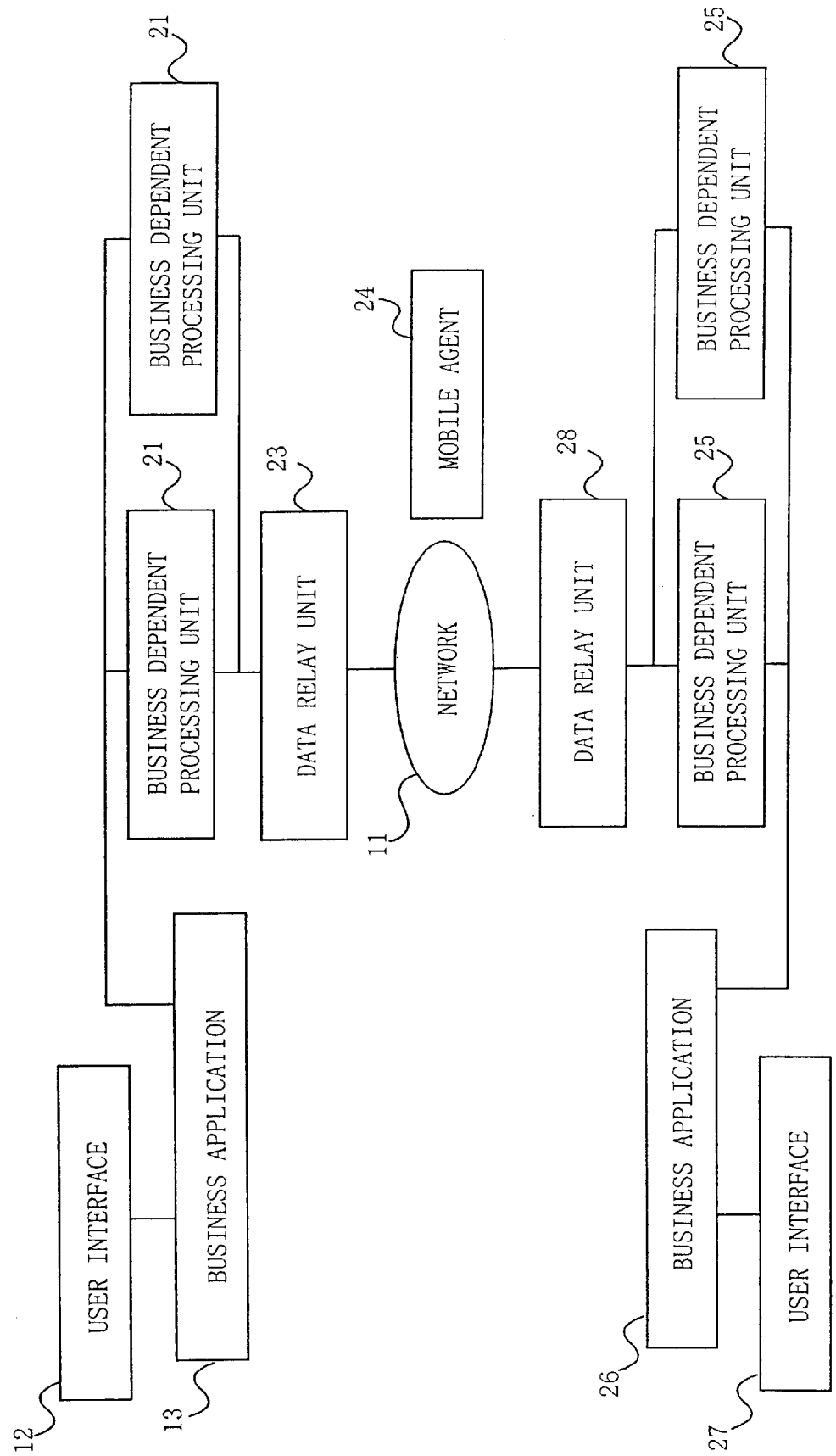
FIG. 8 shows a block diagram illustrating an overall network connection view with an inter-application data transmitting/receiving system according to a third embodiment of the present invention.

FIG. 8 shows an overall network connection view of the inter-application data transmitting/receiving system according to the second embodiment.

The business application 13 of FIG. 8 is connected with two of the business dependent processing units 21 and the business application 26 of FIG. 8 is connected with two of the business dependent processing units 25. Some elements of FIG. 8 are the same as those of FIG. 2 with the same reference numerals and will not be discussed here, for avoiding the repetition of the same explanation as that aforementioned.

The plural number of the business dependent processing units of FIG. 8 can be applied to such a situation when a large amount of data is to be exchanged between the business applications 13 requiring a high performance of transmission rate. Each of the plural number of business dependent processing units monitors the data of the business application individually to detect a change in the status of the data. When detecting the change, the business dependent processing unit automatically executes an operation to deal with the change. This can improve the transmission rate. With a fewer amount of data to be exchanged, on the other hand, a single number of the business dependent processing units may be enough. Thus, the number of the business dependent processing units can be varied depending on required performance of processing rate and throughput.

As aforementioned, a parallel data processing may be allowed with the plural number of business dependent processing units of this embodiment, thereby improving the processing rate.

The number, e.g. two of FIG. 8, of the business dependent processing units may be determined based upon a required rate of processing with no changing, modifying or resetting required with the business application and the data relay unit.

Embodiment 4

A fourth embodiment of the present invention introduces an inter-application data transmitting/receiving system with an alternative business dependent knowledge defining unit designed for ease of defining the flow control rules.

The business dependent knowledge defining unit of this embodiment can be connected with the application interface by the communication protocol provided for the user interface of the application. This involves no change in the application itself and the communication protocol even if the business application is provided with no programming interface or the application is unchangeable itself. Further, if no internal logic of the application or a data schemer is not provided, the flow control rules can be easily written by using the knowledge of the operator of the application.

Embodiment 5

A fifth embodiment of the present invention introduces an inter-application data transmitting/receiving system designed for reducing cost required for creating, adding and/or modifying the data format conversion rules.

Generally, when exchanging data among various applications, the data format of one application has to be converted into the data format of a counterpart application because a different data format is assigned to a different application. In the case of exchanging data between two applications A and B, for example, two types of data format conversion rules are required specifically for converting the data format of application A to that of application B, and vice versa. In an additional connection of a different application, another specific conversion rule is required. The inter-application data transmitting/receiving system of this embodiment provided with the data format conversion rules, the business dependent knowledge defining unit for defining the data format conversion rules easily and the resident agent for interpreting the data format conversion rules into execution, separates the resident agent from the application dependent portion. The resident agent is independent of the application which is a common unit designed for being shared by all the various applications interconnected over the network. This allows a reduction of cost for creating, adding and/or modifying the data format conversion rules.

Embodiment 6

A sixth embodiment of the present invention introduces an inter-application data transmitting/receiving system with an alternative data relay unit provided with a protecting feature of data from network failure, computer failure or the like designed for improving performance of processing rate.

The data relay unit may be isolated from the application interface connected with the application for inputting and outputting data so that a separate j operation is allowed between the data relay unit and the application interface. This allows the application interface to operate in a system different from that where the data relay unit operates or a plural number of the applications interfaces to operate in a plural number of systems for a parallel processing, thereby improving the performance of processing rate.

Embodiment 7

A seventh embodiment of the present invention introduces an inter-application data transmitting/receiving system focusing on an embodiment of the resident agent 20 of FIG. 1.

The embodiment of the resident agent 20 is now discussed with the same overall network connection view as that of FIG. 2 of the first embodiment. While the specific view of FIG. 2 illustrates data transmission/reception between interconnected two applications over the network, the data transmission/reception is applicable to that among more than two applications.

Figure 9:
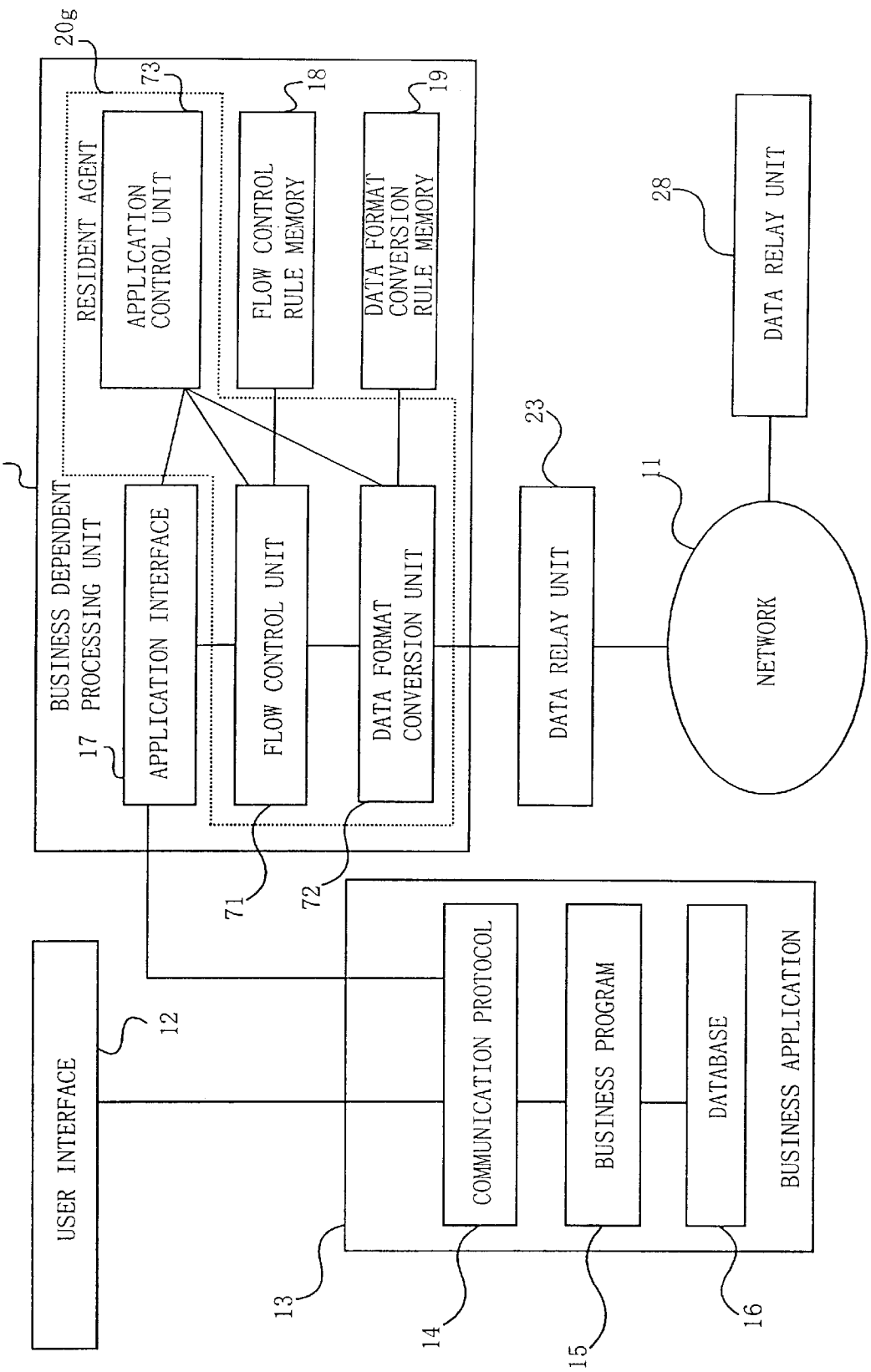
FIG. 9 shows a block diagram illustrating an overall network connection view with an inter-application data transmitting/receiving system according to seventh and eighth embodiments of the present invention.
Figure 10:
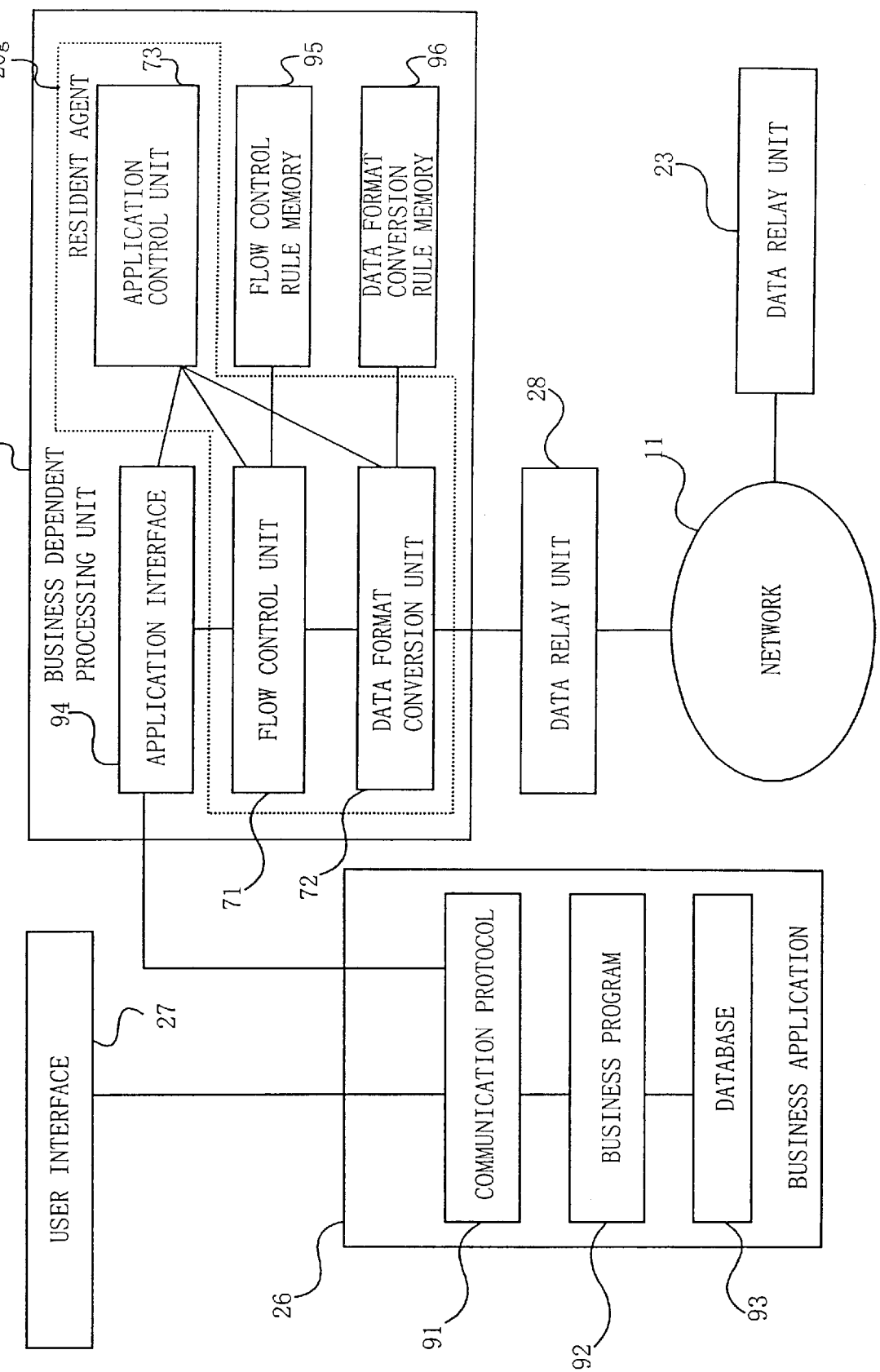
FIG. 10 shows a block diagram of the inter-application data transmitting/receiving system according to the seventh and eighth embodiments.

FIGS. 9 and 10 show block diagrams of an inter-application data transmitting/receiving system of the seventh embodiment. Some elements of FIGS. 9 and 10 are the same as those of FIG. 1 or 2 with the same reference numerals, and will not be discussed here, for avoiding the repetition of the same explanation as that aforementioned. The data relay units 23 and 28 are the same in function although having the different numerals for the purpose of explanation.

A resident agent 20g of this embodiment is now discussed.

Referring to FIG. 9, the resident agent 20g includes a flow control unit 71, a data format conversion unit 72 and an application control unit 73. The flow control unit 71 executes a control command for controlling the application based upon the flow control rules stored in the flow control rule memory 18. The data format conversion unit 72 converts a data format based upon the data format conversion rules stored in the data format conversion rule memory 19. The application control unit 73 controls the operations of the application interface, the flow control unit 71 and the data format conversion unit 72, and monitors data stored in the application to be processed in the business dependent processing unit 21 to detect a change in the status of the data. When detecting the change, the application control unit 73 notifies a counterpart application of the change over the network.

Most of the elements in the business dependent processing unit of FIGS. 9 and 10 having the same names are the same in function. However, application interfaces 17 and 94 may be different because of them depending on the applications 13 and 26, respectively. Similarly, flow control rule memories 18 and 95 as well as data format conversion rule memories 19 and 96 may be different because they depend on the business applications 13 and 26, respectively, and the user's approach to use the applications.

An operation of the inter-application data transmitting/receiving system of this embodiment is now discussed with reference to FIGS. 9 and 10.

The discussion here focuses on the operation of the business dependent processing unit 21 including the resident agent 20g. Operations which are the some as those of the first embodiment will not be discussed here for avoiding the repetition of the same explanation as that aforementioned.

An operation of the business dependent processing unit 21 monitoring data stored in the database 16 in the business application 13 is discussed below, assuming again like the first embodiment that the business application 13 of FIG. 9 represents the system of company A and the business application 26 of FIG. 10 represents the system of company B.

An operation of the system of company A is now discussed with reference to FIG. 9.

The application control unit 73 regularly or based upon predetermined access procedures retrieves data stored in the database 16 via the application interface 17.

The business dependent processing unit 21 gains access to the business application 13 through procedures executed by the flow control unit 71 via the application interface 17 based upon the flow control rules defined in the flow control rule memory 18. The flow control unit 71 is controlled by the application control unit 73. The detailed procedures of the operation is the same as those of the first embodiment discussed with reference to FIG. 5.

The flow control unit 71 stores retrieved data to compare the value of the currently retrieved data with that of the previously retrieved data. With a change detected in the values of the data, the flow control unit 71 notifies the business application 26 of an updated data value, determining that the business application 13 has updated the value of the data.

Specifically, the application control unit 73 outputs an indication so that the data format conversion unit 72 converts the data format of the updated data into the intermediate format based upon the data format conversion rules stored in the data format conversion rule memory 19. The data format conversion unit 72 converts the format of the updated data in accordance with the indication of the application control unit 73. The procedure for converting the data format is the same in detail as that of the flowchart of FIG. 6. Converted intermediate format data has a meaning represented by a position defined in the intermediate format and a tag added and so forth.

The converted intermediate format data is transmitted to the data relay unit 23 from the data format conversion unit 72 where the data is assigned a specific address and then transmitted over the network 11 to the data relay unit 28 connected with the business application 26.

An operation of the system of company B is now discussed with reference to FIG. 10 focusing on processing the intermediate format data thus transmitted to the data relay unit 28.

The intermediate format data transmitted to the data relay unit 28 is processed in the business dependent processing unit 25 through an adverse operation to that performed within the system of company A and transmitted to the business application 26.

Specifically, the intermediate format of the data received from the data relay unit 28 is converted into a data format depending on the business application 26 in the data format conversion unit 72 based upon the data format conversion rules stored in the data format conversion rule memory 19.

The converted data is written into a database 93 within the business application 26. Specifically, the converted data is transmitted to the flow control unit 71. The flow control unit 71 controlled by the application control unit 73 gains access to the business application 26 via the application interface 94 based upon the flow control rules stored in the flow control rule memory 95.

The data thus transmitted to the business application 26 is written into the database 93. An area into which the data is written in the database 93 is determined by the position, the tag and the like in the intermediate format data. The determined area is secured and succeeded by the data format dependent on the business application through conversion in the data format conversion unit 72 based upon the data format conversion rules. The data value thus updated in the business application 13 based upon the data format conversion rules is allowed to be updated also in the business application 26 with the same meaning of the data secured and succeeded.

Consequently, the user of the business application 26 is allowed to retrieve the data updated in the business application 13.

As aforementioned, according to the inter-application data transmitting/receiving system of this embodiment, the business dependent processing unit is allowed to write/read data into/from the business application 13, 26 using the existing interface of the business application. Further, the procedure for gaining access to the database of the business application is designed for a specific business application and executed based upon the flow control rules. This requires no change of the interface, the communication protocol, and so forth of the business application.

A data format dependent on a different business application is converted by the data format conversion unit into the intermediate format as a common data format for transmission in each type of business based upon the data format conversion rules. The intermediate format may be exemplified by a transmission format standard provided for each type of business based upon a language specification of XML (extensible Markup Language).

Embodiment 8

An eighth embodiment of the present invention discusses a case of the inter-application data transmitting/receiving system of FIGS. 9 and 10 involving the notification of the change in the data stored in the business application to a counterpart business application over the network by the business dependent processing unit upon reception of the notification from the business application.

An operation of the inter-application data transmitting/receiving system of this embodiment is now discussed with reference to FIGS. 9 and 10, assuming that the business application 13 of FIG. 9 belongs to the system of company A and the business application 26 of FIG. 10 belongs to the system of company B. Similar to the seventh embodiment, it is assumed that the contents of the database 16 are updated in the system of company A.

An operation of the business dependent processing unit 21 of company A upon notification of the contents of the database updated from the business application 13 is discussed below.

The business program 15 notifies the business dependent processing unit 21 of the updated timing of data, the area of the updated data and/or the value of the updated data. Specifically, the notification is performed by using the communication protocol 14 and transmitted first to the application interface 17 and then to the application control unit 73.

In the event of the updated timing of the data alone being notified, or of the area of the updated data together with the updated timing alone being notified, because the updated value itself remains unnotified, the application control unit 73 requests the business program 15 to read out the data via the application interface 17 so as to obtain the data stored in the database 16 in the same manner as that of monitoring the updating of the data discussed in the seventh embodiment. The application control unit 73 controls the readout data to be stored in the flow control unit 71. Further, the application control unit 73 compares the value of the currently readout data with that of the previously readout data. When detecting a change in the value of the data, the application control unit 73 determines that the business application 13 has updated the contents of the data and executes the notification operation of the updated value of the data to the business application 26 in the system of company B.

In the event of the updated value of the data also being notified, the application control unit 73 controls the value of the data to be stored in the flow control unit 71 if required. Then, the notification operation is performed so as to notify the business application 26 in the system of company B of the updated value of the data. The subsequent operations can be the same as that discussed in the seventh embodiment.

According to this embodiment, the change of the business program 15 is required, when the data of the business application is updated, so as to notify the business dependent processing unit of the timing of the data updated, the area of the updated data and the updated value of the data. However, the notification of the timing of the data updated to the business dependent processing unit from the business application of this embodiment allows an earlier detection of the data updated than the detection of the data updated of the business application by the business dependent processing unit discussed in the seventh embodiment. Further, the amount of data to be stored in the flow control unit in the business dependent processing unit may be reduced.

Embodiment 9

A ninth embodiment of the present invention introduces an inter-application data transmitting/receiving system using a mobile agent for transmitting data between data relay units.

Figure 11:
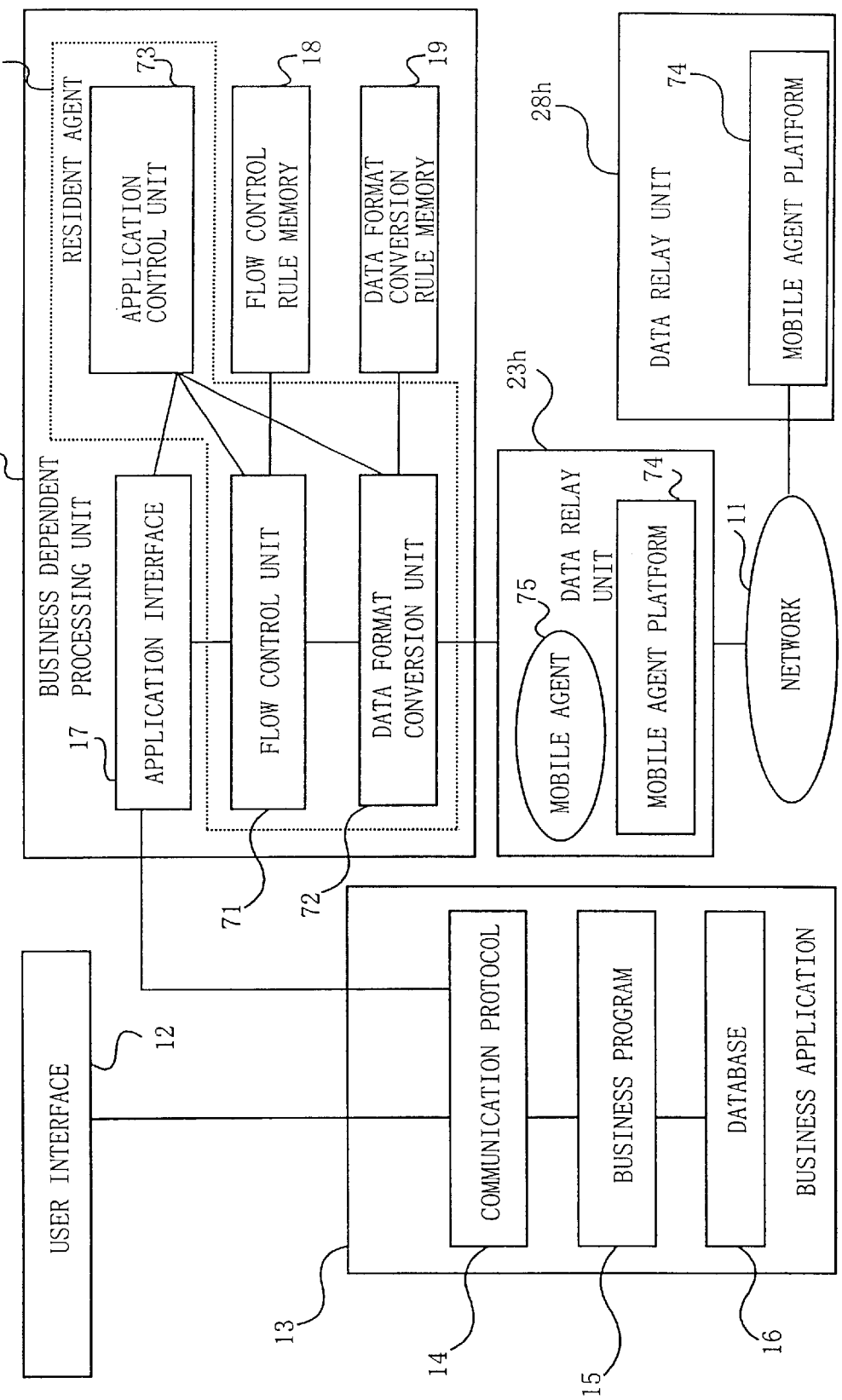
FIG. 11 shows a block diagram of an inter-application data transmitting/receiving system according to a ninth embodiment of the present invention in the case of data transmitted by using a mobile agent.

FIG. 11 shows a block diagram of the inter-application data transmitting/receiving system according to the ninth embodiment. Some elements of FIG. 11 similar to those of FIG. 9 in the reference numerals are considered the same in function as those of the seventh embodiment.

Referring to FIG. 11, a mobile agent 75 including a program and data required for executing the program moves in the network linking a plural number of data relay units therebetween. A mobile agent platform 74 indicates the mobile agent 75 where to move. The mobile agent platform 74 provides the mobile agent 75 with a destination and the execution environment of data and the like to be transmitted. A data relay unit 23h may include the mobile agent platform 74 and the mobile agent 75. The data relay unit 23h of this embodiment generates or receives the mobile agent 75 and extracts transmitted data from the mobile agent 75 received.

The data relay units 23h and 28h of FIG. 11 having different reference numerals for clearer distinction are the same in function.

The resident agent 20g of this embodiment transmits/receives data in the intermediate format via the data relay unit to/from a counterpart data relay unit conveyed by the mobile agent 75 moving in the network.

An operation of the inter-application data transmitting/receiving system of this embodiment is now discussed with reference to FIG. 11, assuming that the data relay unit 28h of FIG. 11 is connected with the business dependent processing unit 25 of FIG. 10.

It is assumed that the data of the business application 13 is transmitted to the data relay unit 23h and then transferred to the data relay unit 28h of a counterpart application system.

The data format of the data received from the business application 13 is converted into the intermediate format in the resident agent 20g and transmitted to the data relay unit 23h in the same manner as that discussed in the seventh embodiment.

The data relay unit 23h, upon reception of the data from the resident agent 20g, generates the mobile agent 75 by setting received data as data to be conveyed by the mobile agent and a data relay unit where to transmit the received data as a destination.

The data relay unit 23h then requests the mobile agent platform 74 to execute the mobile agent 75. Alternatively, instead of generating the mobile agent 75, the data relay unit 23h sets the data to be transmitted and the destination to the mobile agent 75 received and awaiting, and requests the mobile agent platform 74 to move the mobile agent 75. The mobile agent 75 moves within the network based upon a communication protocol determined by the mobile agent platform 74. The mobile agent 75 thus moves over to the destination of the counterpart data relay unit 28h. The data relay unit 28h, upon reception of the mobile agent 75, extracts the data from the mobile agent 75. The extracted data is transmitted to the resident agent 20g in the business dependent processing unit 25 of FIG. 10 by the data relay unit 28h. Operations thereafter are the same as those discussed in the seventh embodiment.

The data transmission in use of the mobile agent of this embodiment allows to use the functions of the mobile agent platform such as encipherment, authorization for gaining access to a specific computer system for data transmission, communication protocol or queuing for securing agent transmission, and optimum route selection memory management within the network. These functions allows the data relay unit to be simplified.

The mobile agent may be exemplified by "Concordia" developed by Mitsubishi Electric Information Technology Center America with "Concordia Server" corresponding to the mobile agent platform and "Concordia agent" corresponding to the mobile agent.

Embodiment 10

A tenth embodiment of the present invention introduces an inter-application data transmitting/receiving system with an additional unit for entering rules in order to update the flow control rule memory 18 and the data format conversion rule memory 19.

Figure 12:
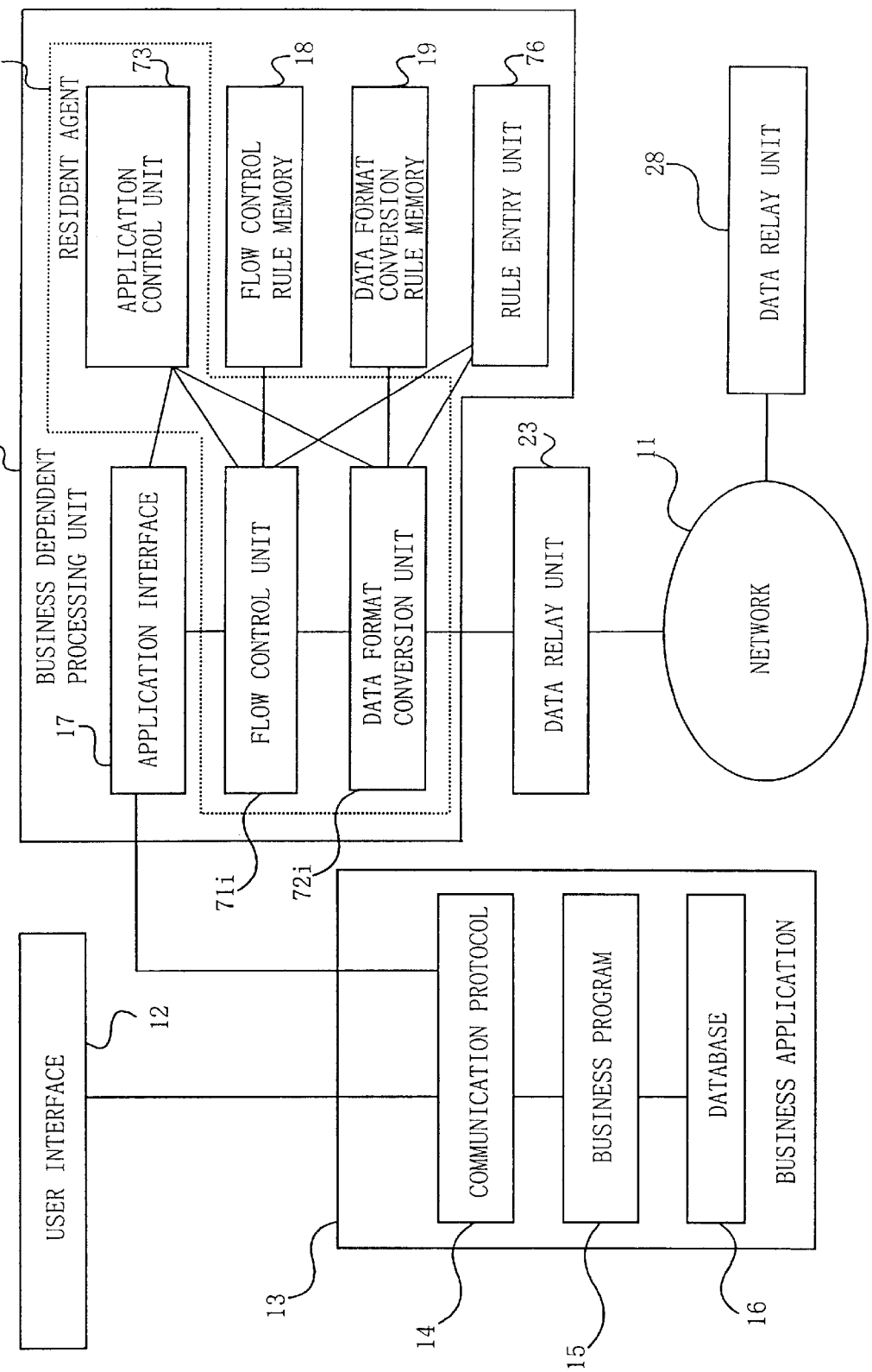
FIG. 12 shows a block diagram of an inter-application data transmitting/receiving system according to a tenth embodiment of the present invention in the case of rules being able to be set by a rule entry unit.

FIG. 12 shows a block diagram of an inter-application data transmitting/receiving system according to the tenth embodiment. Some elements of FIG. 12 having the same reference numerals as those of FIG. 9 are the same in function as those of the seventh embodiment.

Referring to FIG. 12, a rule entry unit 76 is provided for entering data for changing and modifying the flow control rules stored in the flow control rule memory 18 and the data format conversion rules stored in the data format conversion rule memory 19. Specifically, the rule entry unit 76 provides an interface through which data may be entered for setting or updating the contents of data stored in the flow control rule memory 18 and the data format conversion rule memory 19.

A flow control unit 71i is provided with an additional feature to the flow control unit 71 of the seventh embodiment for updating the flow control rules based upon data entered at the rule entry unit 76 for changing or modifying the rules.

A data format conversion unit 72i is provided with an additional feature to the data format conversion unit 72 of the seventh embodiment for updating the data format conversion rules based upon data entered at the rule entry unit 76 for changing or modifying the rules.

An operation of setting/updating the contents of the flow control rule memory 18 or the data format conversion rule memory 19 by the rule entry unit 76 is discussed below.

Here, the discussion is focused on the operation of setting or updating the contents of the flow control rule memory 18 only, for the same operation is applied to that of the data format conversion rule memory 19.

Data is entered to the flow control rule memory 18 at the interface of the rule entry unit, 76. The data entered at the rule entry unit 76 is transferred to the flow control unit 71*i* where the contents of the flow control rule memory 18 are being set. Specifically, the data is set to comply with the flow control rules designed for the business application 13 by the flow control unit 71*i*. The data setting by the flow control unit 71*i* contributes to secure and smooth access to the business application 13.

The flow control rule memory 18 and the data format conversion rule memory 19 have to be prepared for execution based upon the flow procedures and the data format of the business application. With the systems of companies A and B of FIGS. 9 and 10, respectively, of the seventh embodiment, for example, the rules designed for the business application 13 are to be prepared by company A and the rules designed for the business application 26 are to be prepared by company B in an individual manner. Further, a computer system may be configured with various differences from others in particulars such as the method of using the business application, data definition, data evaluation and the like. With the same made business applications, for example, the particulars are different from each other in version related access procedures, user dependent portions such as the definition of data and the way of using the business application, the data format and the like.

The detailed data setting is given by the rule entry memory 76 of this embodiment, which allows a speedy and optimal setting of the flow control rules and the data format conversion rules. Operations thereafter are the same as those discussed in the seventh and previous embodiments.

Alternatively, the rule entry unit 76 may be used for setting all data. A Joint use of the rule entry unit 76 and the business dependent knowledge defining unit of the first embodiment is also possible.

Embodiment 11

An eleventh embodiment of the present invention introduces an inter-application data transmitting/receiving system with an alternative data format conversion rule memory to the data format conversion rule memory 19 of the seventh embodiment. The data format conversion rule memory of this embodiment is provided with two or more data format conversion types to be selected for converting a data format.

The inter-application data transmitting/receiving system of this embodiment is discussed below with reference to FIGS. 13 and 14. Some elements of FIGS. 13 and 14 having the same reference numerals as those of FIG. 9 are the same in function as those of the seventh embodiment.

Figure 13:
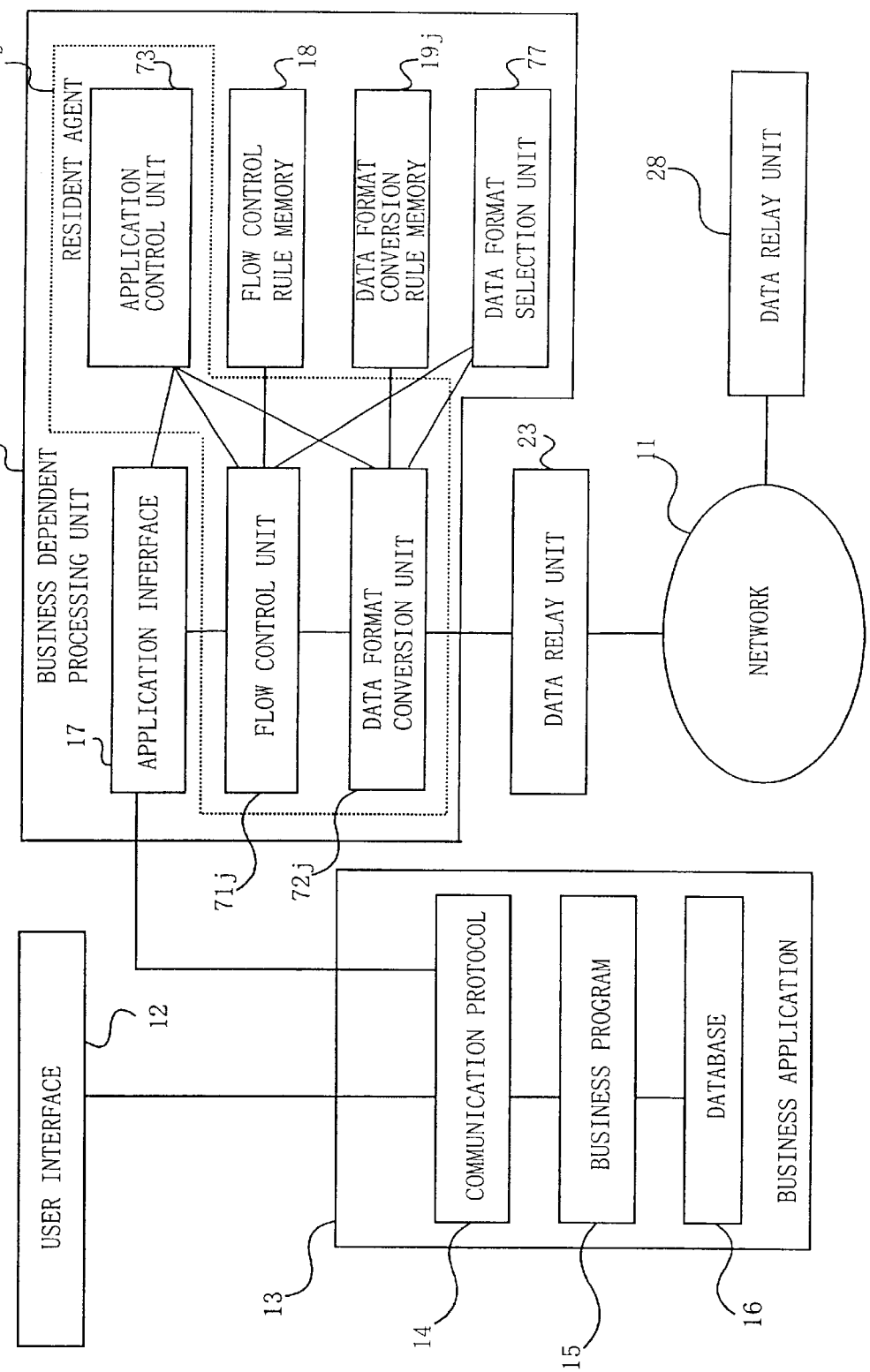
FIG. 13 shows a block diagram of an inter-application data transmitting/receiving system according to an eleventh embodiment of the present invention in the case of data format conversion rules being able to be selected by a data format selection unit.

Referring to FIG. 13, a data format conversion rule memory 19*j* stores a plural number of intermediate formats and a plural number of corresponding data format conversion rules. A data format selection unit 77 selects a data format conversion rule to be used from among the plural number of data format conversion rules stored in the data format conversion rule memory 19*j*. The data format selection unit 77 also controls a flow control unit 71*j* and a data format conversion unit 72*j* to operate based upon a selected data format conversion rule.

The data format conversion unit 72*j* converts a data format into a data format selected in the data format selection unit 77.

The data format conversion rules may be registered in the data format conversion rule memory 19*j* initially through a program or later through the rule entry unit 76 as described in the tenth embodiment.

Figure 14:
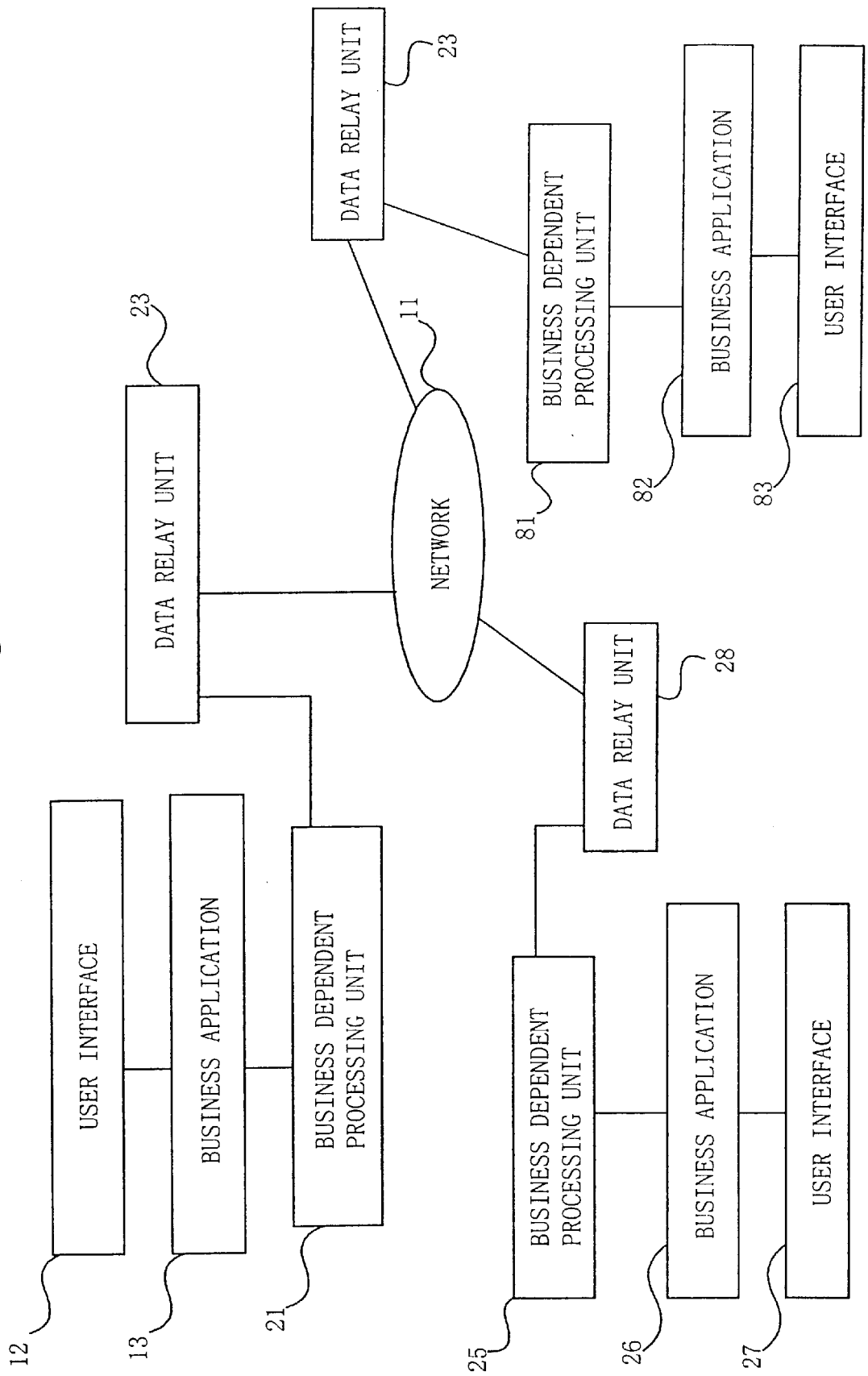
FIG. 14 shows a block diagram illustrating an overall network connection view of the inter-application data transmitting/receiving system of the eleventh embodiment in the case of data exchanged mutually among business applications involving a selection of a data format from among a plural number of intermediate data formats.

FIG. 14 shows an overall network connection view including three interconnected business applications of this embodiment. The embodiment of FIG. 14 includes a system of company C added to the systems of companies A and B of FIG. 2.

The system of company C includes a business dependent processing unit 81, a business application 82, and a user interface 83. The business dependent processing unit 81 is the same in function as that described in the seventh embodiment. The business application 82 is assumed to be of a different type of business from those of the business applications of companies A and B. It is also assumed that an intermediate format designed for the business dependent processing unit 81 of company C is different from that designed for the business dependent processing units 21 and 25, respectively, of companies A and B. Specifically, the business applications 13 and 26 are both designed for customer support business and the business application 82 is for an electronic business transaction business, for example. The intermediate format, although transcribed in common XML linguistic symbols, is a data format for transmission provided for each different type of business. In fact, however, the intermediate format is going to become a standard transmission data format, as a tendency.

Under such circumstances, the data format selection unit 77 effectively selects the intermediate format of a destination or counterpart application of data to be transmitted.

Alternatively, instead of the data format selection unit selecting the intermediate format, an automatic selection of the intermediate format by the control unit 71*j* and the data format conversion unit 72*j* may be preprogrammed.

Embodiment 12

A twelfth embodiment of the present invention introduces an inter-application data transmitting/receiving system directly processing data in the intermediate data converted in the business dependent processing unit.

Figure 15:
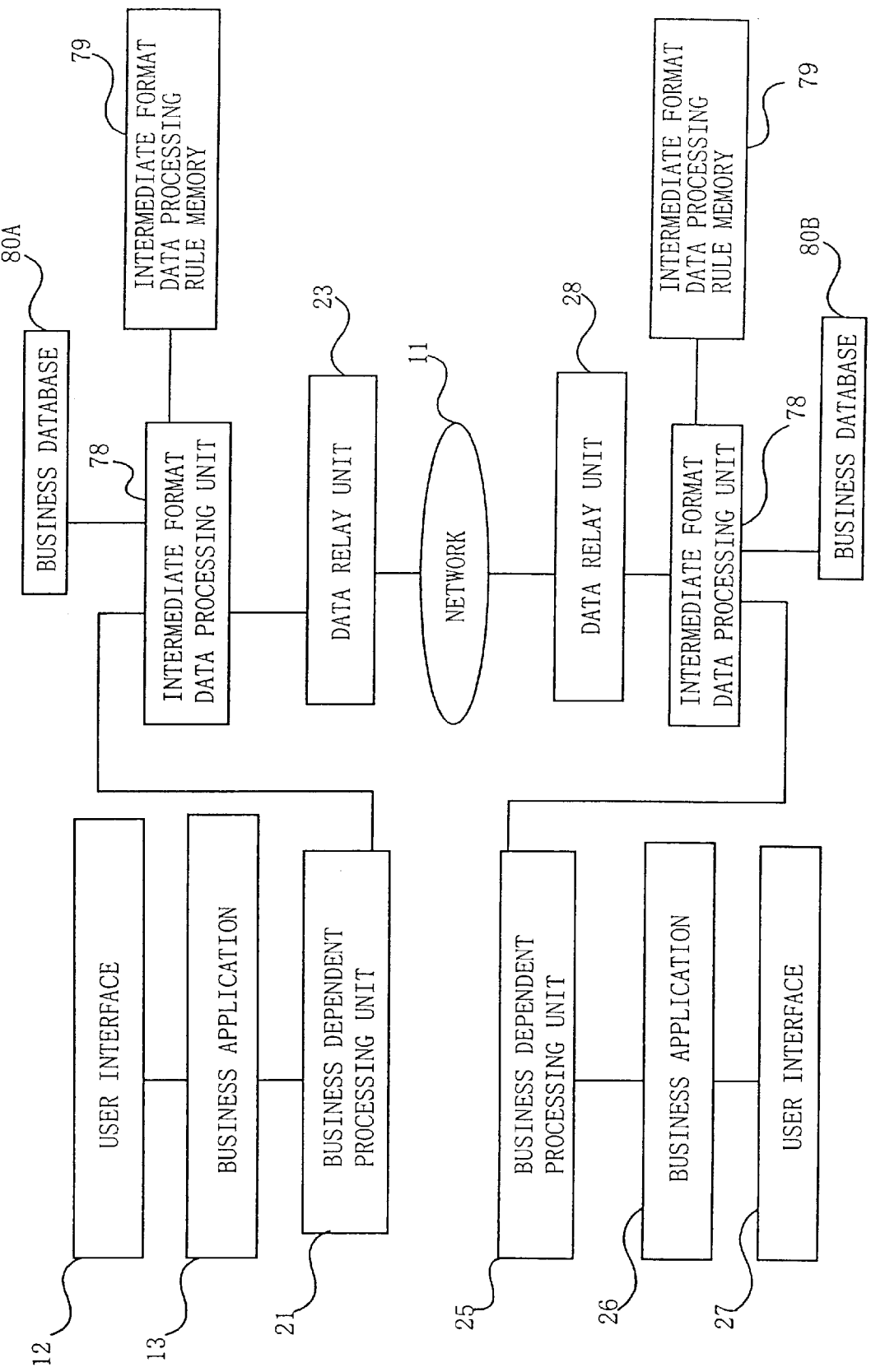
FIG. 15 shows a block diagram illustrating an overall network connection view with an inter-application data transmitting/receiving system according to a twelfth embodiment of the present invention in the case of the intermediate format data processed in a direct manner, and an intermediate format data processing unit (program) and intermediate format data processing rules being able to be downloaded over a network.

FIG. 15 shows an overall network connection view of an inter-application data transmitting/receiving system according to the twelfth embodiment. Some elements of FIG. 15 having the same reference numerals as those of FIG. 9 are the same in function as those of the seventh embodiment.

Referring to FIG. 15, an intermediate format data processing unit 78 processes data in the intermediate format transmitted from the business dependent processing unit 21, 25. An intermediate format data processing rule memory 79 stores rules for processing the intermediate format data in the intermediate format data processing unit 78 as intermediate format data processing rules. Business database 80A, 80B stores processed data by the intermediate format data processing unit 78.

An operation of the inter-application data transmitting/receiving system of this embodiment is now discussed.

The standardization of the intermediate format has made progress in each type of business. As the standardization develops, the definition and processing of data in the intermediate format are developed to be shared. Under such circumstances, the intermediate format data processing unit 78 is applicable to shared business processing.

Specifically, specific data may be extracted from the intermediate format data and added with a type of business processing stored in the intermediate format data processing rule memory 79. Data relating to a customer list is extracted from the intermediate format data to be transmitted to be stored in the business database. A customer management database is automatically created or generated based upon the business database. Alternatively, business data of a higher priority of processing is extracted from the business database and notifies the business application 13 via the business dependent processing unit 21 of the extraction.

The inter-application data transmitting/receiving system of this embodiment designed for processing the data of the standardized intermediate format allows the same software to be used in the intermediate format data processing unit 78 and the intermediate format data processing rule memory 79. Because the operation is performed between the business dependent processing unit and the data relay unit, the operation does not depend on the business applications 13 and 26. Further, it is advantageous to use the same software for executing the same operation for the same result, regardless of the place of the business application. Thus, according to this embodiment, the business dependent processing unit allows part of the function of the business application to be processed in a standardized manner by a software. In addition, the business dependent processing unit allows the processing load of the existing business application to be reduced and a new function of the business application to be easily added.

Embodiment 13

A thirteenth embodiment of the present invention is now discussed with reference to FIG. 15.

As discussed in the eleventh embodiment, the intermediate format data processing unit 78 designed for processing the intermediate format data allows to execute the same business processing operation by the same software among various business applications. Now, the inter-application data transmitting/receiving system of this embodiment obtains a software to be used in the intermediate format data processing unit through download via the network. This allows a concurrent addition or revision of business processing among various business applications of different made. For example, this may be achieved easily by writing the program of a software used in the intermediate format data processing unit 78 in Java language and setting the intermediate format data processing unit for the Java execution environment. Further, another unit of business processing may be performed by adding or updating the intermediate format data processing rules via the network. For example, with an exceedingly frequent exchange of data among applications, the business deals of customer support business and electronic business transaction business may be allocated in a separate manner. By downloading calculation rules and the like to the intermediate format data processing rule memory 79 over the network, the separate allocation of the business deals may be achieved, and further, data stored in the intermediate format data processing rule memory 79 can easily be revised or updated.

Embodiment 14

A fourteenth embodiment of the present invention introduces an inter-application data transmitting/receiving system with an alternative business depending processing unit, if operating in the same computer system as that of the business application 13, using an API (Application Program Interface) provided by the business program 15 for data transmission with the business application 13, in contrast to the business dependent processing unit 21 of the seventh embodiment using the communication protocol 14. According to this embodiment, in other words, inter-process communication, direct function call or the like is used in the replacement of the communication protocol 14 for exchanging data. This improves the processing rate. The inter-application data transmitting/receiving system of this embodiment is now discussed with reference to FIG. 16.

Figure 16:
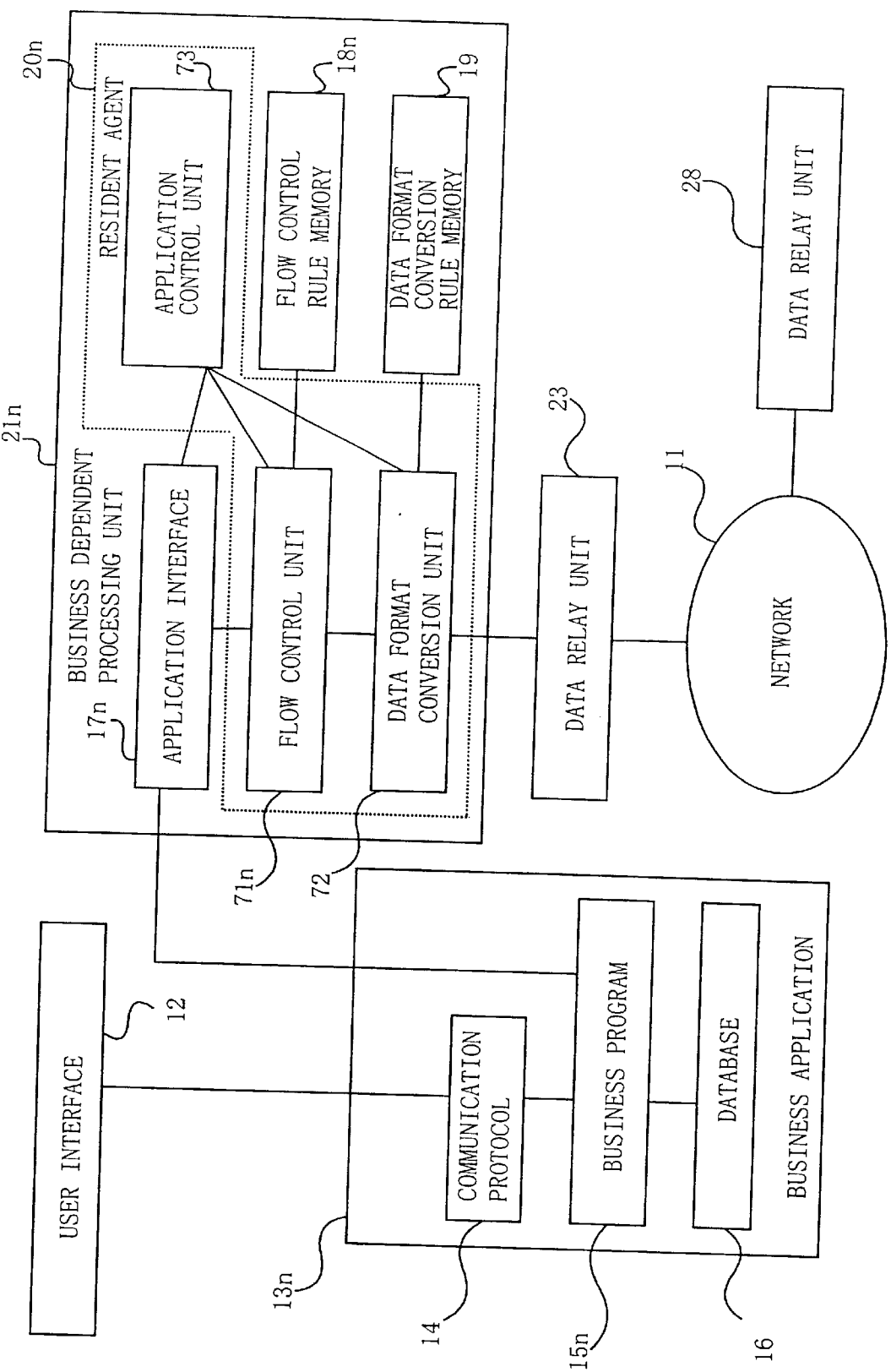
FIG. 16 shows a block diagram illustrating an overall network connection view with an inter-application data transmitting/receiving system according to a fourteenth embodiment of the present invention in the case of a business program being accessed directly from an application interface.

Referring to FIG. 16, an application interface 17*n* of a business depending processing unit 21*n* directly exchanges data with a business program 15*n* of a business application 13*n*, which differs from the operation of the corresponding units of FIG. 9 of the seventh embodiment. This modification is also applicable to exchanging data between the business application 26 and the business depending processing unit 25 of FIG. 10. The other elements of the inter-application data transmitting/receiving system of this embodiment are the same as those of the seventh embodiment in operation and function.

Further, with reference to the notification of updated data from the business application to the application interface introduced in the eighth embodiment, the notification can also be achieved by the business program 15*n* by using the API provided by the application interface 17*n*.

Further, the inter-application data transmitting/receiving system of this embodiment may be applied to data transmission in such a case as the business application and the business depending processing unit are not linked over the network. In the case of the business application and the business dependent processing unit being provided in the same computer system, for example, data can be transmitted/received between the business application and the business dependent processing unit involving no data transmission over the network by changing or modifying the application interface of the business dependent processing unit.

Embodiment 15

A fifteenth embodiment of present invention introduces an inter-application data transmitting/receiving system with an alternative business dependent processing unit making direct access to the database of the business application, while the business dependent processing unit of the previous embodiments gains access to the database of the business application by using the business program of the business application.

This may be achieved by the flow control unit of the resident agent executing the operation performed by the business program of the previous embodiments.

The flow control unit gains direct access to the database of the business application via the application interface. In this case, the flow control rules for gaining the access to the flow control rule memory are to be predetermined.

Further, it is also possible to have the flow control unit of the resident agent perform part of the processing performed by the business program.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An inter-application data transmitting/receiving system comprising:

a data format conversion rule memory for storing a data format conversion rule including a first conversion rule for converting a data format being dependent on an application as an application dependent format into an intermediate format being independent of the application and a second conversion rule for converting the intermediate format into the application dependent format;

a flow control rule memory for storing a flow control rule including first and second control commands for executing the application; and a resident agent for executing the application based upon the first control command to obtain data in the application dependent format and converting the data obtained into the data in the intermediate format based upon the first conversion rule, and for receiving and converting the data in the intermediate format into the data in the application dependent format based upon the second conversion rule and executing the application based upon the second control command to update the data in the application dependent format obtained with the data in the application dependent format received and converted.

2. The inter-application data transmitting/receiving system of claim 1, wherein the resident agent monitors the data in the application dependent format in the application to detect a change of value in the data, executes the application based upon the first control command of the flow control rule stored in the flow control rule memory to obtain the data in the application dependent format when the change is detected, and converts the application dependent format of the data obtained into the intermediate format based upon the first conversion rule.

3. The inter-application data transmitting/receiving system of claim 2 further comprising:

a plurality of business dependent processing units, each of the plurality of business dependent processing units including the data format conversion rule memory, the flow control rule memory and the resident agent; and wherein the respective resident agents of the plurality of the business dependent processing units monitor the data in the application dependent format in the application to detect the change and execute the application individually when detecting the change.

4. The inter-application data transmitting/receiving system of claim 1, wherein the data format conversion rule memory stores a plurality of conditions and corresponding commands for conversion provided for each of the first and second conversion rules; and wherein, when one of the plurality of conditions for conversion is satisfied, the resident agent converts the application dependent format of the data into the intermediate format based upon a corresponding one of the plurality of commands for conversion.

5. The inter-application data transmitting/receiving system of claim 4 further comprising:

a business dependent knowledge defining unit for generating the data format conversion rule stored in the data format conversion rule memory.

6. The inter-application data transmitting/receiving system of claim 1, wherein the flow control rule memory stores a plurality of conditions and corresponding commands for control provided for each of the first and second control commands; and wherein, when one of the plurality of conditions for control is satisfied, the resident agent executes the application based upon a corresponding one of the plurality of commands for control.

7. The inter-application data transmitting/receiving system of claim 6 further comprising:

a business dependent knowledge defining unit for generating the flow control rule stored in the flow control rule memory.

8. The inter-application data transmitting/receiving system of claim 1 further comprising:

an application interface for communicating and interfacing with the application; and wherein the resident agent controls the application via the application interface.

9. The inter-application data transmitting/receiving system of claim 1 further comprising:

a data relay unit for relaying the data to be transferred from the application to another application;

a mobile agent for receiving and conveying the data relayed by the data relay unit;

wherein the resident agent transfers the data in the intermediate format to the mobile agent via the data relay unit;

wherein the mobile agent receives and conveys the data in the intermediate format; and wherein the resident agent receives the data in the intermediate format over a network via the data relay unit and converts the intermediate format of the data received into the application dependent format.

10. The inter-application data transmitting/receiving system of claim 9, wherein the mobile agent moves within the network to convey the data in the intermediate format.

11. The inter-application data transmitting/receiving system of claim 1 further comprising:

a mobile agent for conveying the data over a network, wherein the mobile agent stays and acts as the resident agent.

12. The inter-application data transmitting/receiving system according to claim 1, wherein the first control command includes a command to monitor a change in the data, the change in the data including new data, updated data, or deleted data.

13. An inter-application data transmitting/receiving system, comprising:

a first application having a first communication protocol;

a first system connected with the first application using the first communication protocol including, a first data format conversion rule memory for storing a first conversion rule for converting a data format being dependent on the first application as a first application dependent format into an intermediate format being independent of the first application, a first flow control rule memory for storing a first control command for executing the first application, and a first resident agent for executing the first application based upon the first control command stored in the first flow control rule memory to obtain data in the first application dependent format and converting the first application dependent format of the data into the intermediate format based upon the first conversion rule;

a second application having a second communication protocol; and a second system connected with the second application using the second communication protocol linked to the first system over a network, the second system including,
  a second data format conversion rule memory for storing a second conversion rule for converting the intermediate format of the data into a data format being dependent on the second application as a second application dependent format;
  a second flow control rule memory for storing a second control command for executing the second application; and
  a second resident agent for receiving the data in the intermediate format over the network, converting the intermediate format of the data received into the second application dependent format based upon the second conversion rule, executing the second application to update the data in the second application dependent format with the data received in the second application dependent format based upon the second control command stored in the second flow control rule memory.

14. The inter-application data transmitting/receiving system of claim 13 further comprising:
  a data relay unit connected with the network for relaying the data to be transferred from the first application to the second application;
  wherein the first resident agent transfers the data in the intermediate format to the relay unit over the network; and
  wherein the second resident agent receives the data in the intermediate format relayed over the network through the relay unit and converts the intermediate format of the data into the second application dependent format. exchanging the data in the intermediate format among the interconnected applications over the network.

15. An inter-application data transmitting/receiving system for exchanging data among interconnected applications over a network, the inter-application data transmitting/receiving system comprising:
  a business dependent processing unit for gaining access to an application through a procedure defined for the application, executing the application based upon a control command predetermined for executing the application, receiving data in a format being dependent on the application as an application dependent format, converting the application dependent format of the data into an intermediate format to be shared by the interconnected applications for transmitting the data, and exchanging the data in the intermediate format among the interconnected applications over the network.
  wherein the business dependent processing unit includes:
    an application interface for gaining the access to the application through the procedure defined for the application; a flow control rule memory for storing a flow control rule including the control command for executing the application;
    a data format conversion rule memory for storing the application dependent format, the intermediate format, and a data format conversion rule including a first conversion rule and a second conversion rule; and
    a resident agent for executing the application based upon the flow control rule via the application interface to obtain the data in the application dependent format, converting the application dependent format of the data obtained into the intermediate format based upon the first conversion rule wren transmitting the data obtained over the network and when receiving the data over the network, for converting the intermediate format of the data received into the application dependent format based upon the second conversion rule, executing the application based upon the flow control rule to update the data obtained in the application dependent format with the data received in the application dependent format.

16. The inter-application data transmitting/receiving system of claim 13, wherein the resident agent includes,
  a flow control unit for executing the application based upon the flow control rule stored in the flow control rule memory;
  a data format conversion unit for converting the application dependent format into the intermediate format based upon the data format conversion rule stored in the data format conversion rule memory; and
  an application control unit for controlling the application interface, the flow control unit and the data format conversion unit, monitoring the data in the application dependent format to detect a change of value in the data, and notifying a counterpart application over the network of the change.

17. The inter-application data transmitting/receiving system of claim 16, wherein the application control unit, upon reception of the notification of the change from the application, notifies the counterpart application of the change.

18. The inter-application data transmitting/receiving system of claim 16, wherein the business dependent processing unit includes a rule entry unit for receiving rule updating data for updating the flow control rule and the data conversion rule,
  wherein the flow control unit updates the flow control rule based upon the rule updating data, and
  wherein the data format conversion unit updates the data format conversion rule based upon the rule updating data.

19. The inter-application data transmitting/receiving system of claim 15, wherein the data format conversion rule memory stores a plurality of intermediate formats and a corresponding plurality of data format conversion rules;
  wherein the business dependent processing unit includes a data format selection unit for selecting one of the corresponding plurality of data format conversion rules stored in the data format conversion rule memory, and
  wherein the data format conversion unit converts the application dependent format of the data into one of the plurality of intermediate formats using a selected one of the corresponding plurality of data format conversion rules by the data format selection unit.

20. The inter-application data transmitting/receiving system of claim 15 further comprising: a data relay unit provided between the business dependent processing unit and the network for relaying the data in the intermediate format, the data relay unit including, a mobile agent moving within the network, and a mobile agent platform for indicating a destination of the mobile agent; and wherein the resident agent receives the data in the intermediate format from the data relay unit of another application via the mobile agent.

21. The inter-application data transmitting/receiving system of claim 15, wherein the application interface gains the access to the application based upon a communication protocol designed for the application.

22. The inter-application data transmitting/receiving system of claim 15, wherein the application interface gains the access to the application through an application interface designed for the application.

23. The inter-application data transmitting/receiving system of claim 15, further comprising:
a mobile agent for conveying the data over a network, wherein the mobile agent stays and acts as the resident agent.

24. The inter-application data transmitting/receiving system of claim 15 further comprising:
an intermediate format data processing unit for processing the data in the intermediate format transferred from the business dependent processing unit; and
an intermediate format data processing rule memory for storing an intermediate format data processing rule for processing the data in the intermediate format in the intermediate format data processing unit.

25. The inter-application data transmitting/receiving system of claim 24, wherein the intermediate format data processing unit obtains a program for processing the data in the intermediate format from an external computer over the network.

26. The inter-application data transmitting/receiving system of claim 24, wherein the intermediate format data processing rule memory obtains the intermediate format data processing rule from an external computer over the network to be stored.

27. A method for transmitting/receiving data among a plurality of interconnected applications over a network, the method comprising the steps of:
interfacing an application through a procedure designed for the application to be processed;
storing a flow control rule for executing the application in a flow control rule memory for executing the application;
storing a data format dependent on the application as an application dependent format, a data format shared for exchanging data among the plurality of applications as an intermediate format and a data format conversion rule including a first conversion rule and a second conversion rule in a data format conversion rule memory;
executing the application based upon the flow control rule to obtain the data;
converting the application dependent format of the data into the intermediate format to be transmitted over the network based upon the first conversion rule;
receiving the data over the network;
converting the intermediate format of the data received into the application dependent format based upon the second conversion rule; and
executing the application based upon the flow control rule to update the data obtained in the application dependent format with the data received in the application dependent format.

28. A computer readable storage medium having a computer readable program code stored therein for causing data to be exchanged among a plurality of interconnected applications over a network, the computer readable program code comprising:
an interface code segment for causing a computer to interface and application through a procedure designed for the application to be processed;
a first storing code segment for causing the computer to store a flow control rule in a flow control rule memory;
a second storing code segment for causing the computer to store a data format dependent on the application as an application dependent format, a data format to be shared among the plurality of interconnected applications for exchanging the data as an intermediate format and a data format conversion rule including a first conversion rule and a second conversion rule in a data format conversion rule memory;
a first execution code segment for causing the computer to execute the application based upon the flow control rule to obtain the data in the application dependent format;
a first conversion code segment for causing the computer to convert the application dependent format of the data obtained into the intermediate format to be transmitted over the network based upon the first conversion rule;
a receive code segment for causing the computer to receive the data over the network;
a second conversion code segment for causing the computer to convert the intermediate format of the data received over the network into the application dependent format based upon the second conversion rule; and
a second execution code segment for causing the computer to execute the application based upon the flow control rule to update the data obtained in the application dependent format with the data received in the application dependent format.

* * * * *